United States Patent
Hung et al.

(10) Patent No.: US 7,386,539 B2
(45) Date of Patent: Jun. 10, 2008

(54) SYSTEM, METHOD, AND USER INTERFACE PROVIDING CUSTOMIZED DOCUMENT PORTFOLIO MANAGEMENT

(75) Inventors: Lup Cheong Patrick Hung, Hsin-Chu (TW); John Kao, Hsin-Chu (TW); Frank Sung, Hsin-Chu (TW); Yu-Jen Chen, Taipei (TW); Edwin D. Liou, Taipei (TW); Ming-Hsin Thomas Chen, Hsin-Chu (TW); Jeffrey Liou, Hsin-Chu (TW); Yu Yong Shen, Taipei (TW); Chun-Cho Chen, Hsin-Chu (TW)

(73) Assignee: Taiwan Semiconductor Manufacturing Company, Ltd., Hsin-Chu (TW)

(*) Notice: Subject to any disclaimer, the term of this patent is extended or adjusted under 35 U.S.C. 154(b) by 693 days.

(21) Appl. No.: 10/340,559

(22) Filed: Jan. 10, 2003

(65) Prior Publication Data

US 2004/0107175 A1    Jun. 3, 2004

Related U.S. Application Data

(63) Continuation-in-part of application No. 10/321,139, filed on Dec. 16, 2002, now abandoned, which is a continuation-in-part of application No. 10/307,180, filed on Nov. 29, 2002, now abandoned.

(51) Int. Cl.
*G06F 17/30* (2006.01)
(52) U.S. Cl. .......................................................... 707/3
(58) Field of Classification Search ............... 707/1–10, 707/100–104.1, 200–206; 705/10, 35; 717/140
See application file for complete search history.

(56) References Cited

U.S. PATENT DOCUMENTS

| | | | |
|---|---|---|---|
| 5,517,515 A | 5/1996 | Spall et al. | |
| 5,551,013 A | 8/1996 | Beausoleil et al. | |
| 5,579,441 A | 11/1996 | Bezek et al. | |
| 5,588,152 A | 12/1996 | Dapp et al. | |
| 5,590,345 A | 12/1996 | Barker et al. | |
| 5,625,836 A | 4/1997 | Barker et al. | |
| 5,708,836 A | 1/1998 | Wilkinson et al. | |
| 5,710,935 A | 1/1998 | Barker et al. | |
| 5,713,037 A | 1/1998 | Wilkinson et al. | |
| 5,717,943 A | 2/1998 | Barker et al. | |
| 5,717,944 A | 2/1998 | Wilkinson et al. | |
| 5,734,582 A | 3/1998 | Bertolet et al. | |

(Continued)

FOREIGN PATENT DOCUMENTS

TW            331612            5/1998

(Continued)

*Primary Examiner*—Diane Mizrahi
(74) *Attorney, Agent, or Firm*—Slater & Matsil, L.L.P.

(57) ABSTRACT

A system for customized document portfolio management. Corresponding methods and user interfaces are provided accordingly for allowing customized document portfolio management. In an preferred embodiment the system includes a document metadata database storing a plurality of documents and meta information thereof, a management server programmed to rule engine, search, security engine and notification engines, and a web server providing an interactive website for displaying documents and allowing creation of a customized portfolio. The customized portfolio management system preferably provides notification on the website, apprising users of changes in the status of their documents. Unique technical identification codes may be used to establish relationships among document.

29 Claims, 27 Drawing Sheets

U.S. PATENT DOCUMENTS

| | | | |
|---|---|---|---|
| 5,752,067 A | 5/1998 | Wilkinson et al. |
| 5,754,871 A | 5/1998 | Wilkinson et al. |
| 5,761,523 A | 6/1998 | Wilkinson et al. |
| 5,765,011 A | 6/1998 | Wilkinson et al. |
| 5,794,059 A | 8/1998 | Barker et al. |
| 5,799,170 A | 8/1998 | Drumm et al. |
| 5,805,915 A | 9/1998 | Wilkinson et al. |
| 5,812,130 A | 9/1998 | Van Huben et al. |
| 5,815,723 A | 9/1998 | Wilkinson et al. |
| 5,822,608 A | 10/1998 | Dieffenderfer et al. |
| 5,826,265 A | 10/1998 | Van Huben et al. |
| 5,828,894 A | 10/1998 | Wilkinson et al. |
| 5,842,031 A | 11/1998 | Barker et al. |
| 5,864,875 A | 1/1999 | Van Huben et al. |
| 5,870,619 A | 2/1999 | Wilkinson et al. |
| 5,878,241 A | 3/1999 | Wilkinson et al. |
| 5,878,408 A | 3/1999 | Van Huben et al. |
| 5,893,079 A | 4/1999 | Cwenar |
| 5,910,733 A | 6/1999 | Bertolet et al. |
| 5,920,867 A | 7/1999 | Van Huben et al. |
| 5,920,873 A | 7/1999 | Van Huben et al. |
| 5,950,201 A | 9/1999 | Van Huben et al. |
| 5,963,745 A | 10/1999 | Collins et al. |
| 5,963,746 A | 10/1999 | Barker et al. |
| 5,966,528 A | 10/1999 | Wilkinson et al. |
| 6,016,478 A | 1/2000 | Zhang et al. |
| 6,026,391 A | 2/2000 | Osborn et al. |
| 6,035,117 A | 3/2000 | Beausoleil et al. |
| 6,035,297 A | 3/2000 | Van Huben et al. |
| 6,051,030 A | 4/2000 | Beausoleil et al. |
| 6,088,693 A | 7/2000 | Van Huben et al. |
| 6,094,654 A | 7/2000 | Van Huben et al. |
| 6,094,715 A | 7/2000 | Wilkinson et al. |
| 6,115,640 A | 9/2000 | Tarumi |
| 6,154,753 A | 11/2000 | McFarland |
| 6,161,113 A | 12/2000 | Mora et al. |
| 6,182,080 B1 * | 1/2001 | Clements ................. 707/102 |
| 6,185,710 B1 | 2/2001 | Barnhart |
| 6,272,665 B1 | 8/2001 | Johnson et al. |
| 6,275,987 B1 | 8/2001 | Fraley et al. |
| 6,314,390 B1 | 11/2001 | Bittner et al. |
| 6,317,777 B1 | 11/2001 | Skarbo et al. |
| 6,446,053 B1 | 9/2002 | Elliott |
| 6,618,730 B1 | 9/2003 | Poulter et al. |
| 6,970,875 B1 | 11/2005 | Dey |
| 2001/0014877 A1 | 8/2001 | Defrancesco, Jr. et al. |
| 2002/0002481 A1 | 1/2002 | Uchio et al. ................. 705/9 |
| 2002/0026425 A1 | 2/2002 | Fahraeus ................. 705/64 |
| 2002/0116395 A1 | 8/2002 | Christensen |
| 2004/0002972 A1 * | 1/2004 | Pather et al. ................. 707/6 |
| 2005/0004856 A1 * | 1/2005 | Brose et al. ................. 705/35 |
| 2005/0010510 A1 * | 1/2005 | Brose et al. ................. 705/35 |
| 2005/0154628 A1 * | 7/2005 | Eckart et al. ................. 705/10 |
| 2005/0240909 A1 * | 10/2005 | Tersigni ................. 717/140 |

FOREIGN PATENT DOCUMENTS

| | | |
|---|---|---|
| TW | 460819 | 10/2001 |
| TW | 487879 | 5/2002 |
| TW | 495687 | 7/2002 |

* cited by examiner

DocuFast - BOD Construction

- DocuFast
  - Self-Guided Navigation
  - BOD Overview
  - Technology Selection
  - BOD Construction
  - BOD Maintenance

Technology: 0.25um Logic General Purpose 1P5M 2.5V / 3.3V Al

Technical Document [Library]

Please select documents for your own BOD (Bill of Document):
NOTE: Document download privilege follows logon user's Online privilege setting!

● Version Conflict  [R] Recommended by TSMC
Total Recommended Documents: 1

First [1] 2 Last 0.25um Logic General Purpose IP5M 2.5V / 3.3V Al

| Select All | Status | Doc Type | Document Number Description | Current Ver. Eff. Date | Remark |
|---|---|---|---|---|---|
| ☑ | | Brief Design Rule | T-025-LO-DR-008<br>0.25UM LOGIC (1P5M, 2.5V.3.3V) SALICIDE PROCESS BRIEF DESIGN RULE | 1.1<br>12/04/1997 | |
| ☑ | | DRC Command File | T-000-FC-DR-001-H1<br>TSMC FLIP CHIP BOND PAD DRC (HERCULES) COMMAND FILE FOR AL PAD | 2.0A<br>06/25/2002 | ADD BP.W.2, BP.W.3, BP.$.3, BP.R.S, BP.R.4, UBM PM LAYER AS DRAWN LAYERS, MODIFY PD->PM, UPDATE TABLE1 &TABLE2, BP.E.1, BP.1.2.1, |
| ☑ | | DRC Command File | T-000-LO-DR-001-D1<br>TSMC AL BOND PAD DRC (LA) COMMAND FILE | 2.2A<br>12/21/2001 | |
| Unselect All | | | | | |

[Add to BOD]  [Cancel]

First [1] 2 Last

FIG. 2E

DocuFast – BOD Overview

- DocuFast Self-Guided Navigation
- BOD Overview
- Technology Selection
- BOD Construction
- BOD Maintenance

Company Name: DocuFast Corporation
User Name: Tina Lan

[View Tech Doc] [Technology Fact Sheet] [Create New BOD] [Delete BOD]
[View Library] [Library Information] [Share BOD] [Save As]

◉ Obsolete  ◉ Version Conflict  ◉ New Version  ⚡NEW⚡ New Release  [R] Recom by TSMC

BOD Dashboard

| | Owner ▲▼ | BOD ▲▼ Description ▲▼ | Date Created ▲▼ | ECN | Technology | Library |
|---|---|---|---|---|---|---|
| ⊙ | Lan Tina | 0.25um Logic General Purpose | 11/06/02 | | 0.25um Logic General Purpose 1P5M 2.5V / 3.3V Al | TSMC |
| ○ | Lan Tina | 0.18um Logic General Purpose 1P6M | 11/06/02 | 220 ◉[R] | 0.18um Logic General Purpose 1P6M 1.8V / 3.3V Al | TSMC ProviderA |
| ○ | Fourth Morris | 0.15um Logic Low Voltage 1P7M 1.2V / 3.3V Al | 10/02/02 | NEW | 0.15um Logic Low Voltage 1P7M 1.2V / 3.3V Al | TSMC |

*FIG. 3A*

DocuFast – BOD Overview

- DocuFast
- Self-Guided Navigation

BOD Overview — Technology Selection — BOD Construction — BOD Maintenance — DocuFast Corporation Company Name: DocuFast Corporation
User Name: Robert Geen

[View Tech Doc] [Technology Fact Sheet] [Create New BOD] [Delete BOD]
[View Library] [Library Information] [Share BOD] [Save As]

◐ Obsolete  ⊕ Version Conflict  ◉ New Version  NEW New Release  [R] Recommended by TSMC

BOD Dashboard

| OWNER ▲▼ | BOD ▲▼ Description ▲▼ | Date Created ▲▼ | ECN | Technology | Library |
|---|---|---|---|---|---|
| Wu | 0.25um Logic General Purpose 1P5M 2.5V / 3.3V Al | | | | |
| ⊙ caroll | 0.25um Logic General Purpose 1P5M 2.5V / 3.3V Al | 01/06/03 | | 0.25um Logic General Purpose 1P5M 2.5V / 3.3V Al | N/A |

DocuFast – BOD

- DocuFast
  - Self-Guided Navigation
    - BOD Overview
    - Technology Selection
    - BOD Construction
    - BOD Maintenance

BOD Name: 0.25um Logic General Purpose
BOD Description: 0.25um Logic General Purpose
Technology: 0.25um Logic General Purpose 1P5M 2.5V / 3.3V A1

I would like to receive Engineering Change Notification (ECN) for this BOD: Yes [Edit]

⬤ Obsolete  ⬤ Version Conflict  ⬤ New Version  [R] Recommended by TSMC

NOTE: Document download privilege follows logon user's Online privilege setting!
[ Download BOD in CSV Format ]

[Technical Document | Library]

| Status | Doc Type | Document Number / Description | Current Ver. Eff. Date | New Version Eff. Date |
|---|---|---|---|---|
| Select All | Unselect All | | | |
| 0.25um Logic General Purpose 1P5M 2.5V / 3.3V A1 | | | | |
| ☐ | Brief Design Rule | T-025-LO-DR-008 <br> 0.25UM LOGIC (1P5M, 2.5V/3.3V) SALICIDE PROCESS BRIEF DESIGN RULE | 1.1 <br> 12/04/1997 | |
| ☐ | DRC Command File | T-000-LO-DR-001-D1 <br> TSMC AL BOND PAD DRC(DRACULA) COMMAND FILE | 2.2A <br> 12/21/2001 | |
| Select All | Unselect All | | | |

[Update Version] [Delete] [Add More Documents] [BOD Overview]

DocuFast - BOD

BOD Name: 0.25um Logic General Purpose
BOD Description: 0.25um Logic General Purpose
Technology: 0.25um Logic General Purpose 1P5M 2.5V / 3.3V Al

- DocuFast
- Self-Guided Navigation
- BOD Overview
- Technology Selection
- BOD Construction
- BOD Maintenance I would like to receive Engineering Change Notification (ECN) for this BOD: Yes [Edit]

◉ Obsolete  ◉ Version Conflict  ◉ New Version  [R] Recommended by TSMC

NOTE: Document download privilege follows logon user's Online privilege setting!
[Download BOD in CSV Format]

Technical Documents | Library

| Status | Doc Type | Document Number / Description | Current Ver. Eff. Date | New Version Eff. Date | Remark |
|---|---|---|---|---|---|
| Select All | Unselect All | | | | |
| | | 0.25um Logic General Purpose 1P5M 2.5V / 3.3V A1 | | | |
| ☐ | Bond Pad Design Rule | T-000-LO-DR-001 / TSMC AL BOND PAD DESIGN RULE | 2.3 / 11/02/2001 | | |
| ☐ | Brief Design Rule | T-025-LO-DR-008 / 0.25UM LOGIC (1P5M, 2.5V/3.3V) SALICIDE PROCESS BRIEF DESIGN RULE | 1.1 / 10/08/2002 | | |
| ☑ | DRC Command File — 240 | T-000-FC-DR-001-C1 / TSMC FLIP CHIP BOND PAD DRC (CALIBRE) COMMAND FILE FOR Al PAD | 2.0A / 06/25/2002 | | OBSOLETE (10/08/2002) |
| Select All | Unselect All | | | | |

[Update Version]  [Delete]  [Add More Documents]  [BOD Overview]

DocuFast - BOD

BOD Name: 0.25um Logic General Purpose
BOD Description: 0.25um Logic General Purpose
Technology: 0.25um Logic General Purpose 1P5M 2.5V / 3.3V A1

- DocuFast Self-Guided Navigation: BOD Overview — Technology Selection — BOD Construction — BOD Maintenance

[Edit]

I would like to receive Engineering Change Notification (ECN) for this BOD: Yes

● Obsolete  ● Version Conflict  ● New Version  [R] Recommended by TSMC

NOTE: Document download privilege follows logon user's Online privilege setting!
[ Download BOD in CSV Format ]

Technical Documents | Library

| Status | Doc Type | Document Number / Description | Current Ver. Eff. Date | New Version Eff. Date | Remark |
|---|---|---|---|---|---|
| Select All | Unselect All | | | | |
| | 0.25um Logic General Purpose 1P5M 2.5V / 3.3V AI | | | | |
| ☐ | Bond Pad Design Rule | T-000-LO-DR-001 / TSMC AL BOND PAD DESIGN RULE | 2.3  11/02/2001 | | |
| ☑ 220 ● 240 | Brief Design Rule | T-025-LO-DR-008 / 0.25UM LOGIC (1P5M, 2.5V/3.3V) SALICIDE PROCESS BRIEF DESIGN RULE | 1.0  12/04/1997 | 1.1  10/00/2002 | |
| ☐ ● | DRC Command File | T-000-FC-DR-001-C1 / TSMC FLIP CHIP BOND PAD DRC (CALIBRE) COMMAND FILE FOR AI PAD | 2.0A  06/25/2002 | | OBSOLETE (10/08/2002) |
| Select All | Unselect All | | | | |

[Update Version]  [Add More Documents]  [Delete]  [BOD Overview]

DocuFast - BOD

BOD Name: 0.25um Logic General Purpose
BOD Description: 0.25um Logic General Purpose
Technology: 0.25um Logic General Purpose 1P5M 2.5V / 3.3V Al

- DocuFast
- Self-Guided Navigation —— BOD Overview —— Technology Selection —— BOD Construction —— BOD Maintenance I would like to receive Engineering Change Notification (ECN) for this BOD: Yes [Edit]

🌐 Obsolete   ● Version Conflict   ⊕ New Version   [R] Recommended by TSMC

NOTE: Document download privilege follows logon user's Online privilege setting!
[ Download BOD in CSV Format ]

Technical Documents | Library

| Status | Doc Type | Document Number / Description | Current Ver. Eff. Date | New Version Eff. Date | Remark |
|---|---|---|---|---|---|
| Select All | Unselect All | | | | |
| 0.25um Logic General Purpose 1P5M 2.5V / 3.3V Al | | | | | |
| ☐ | Bond Pad Design Rule | T-000-LO-DR-001 / TSMC AL BOND PAD DESIGN RULE | 2.3 / 11/02/2001 | | |
| ☐ | Brief Design Rule — 240 | T-025-LO-DR-008 / 0.25UM LOGIC (1P5M, 2.5V/3.3V) SALICIDE PROCESS BRIEF DESIGN RULE | 1.1 / 10/08/2002 | | |
| ☑ | 🌐 | DRC Command File | T-000-FC-DR-001-C1 / TSMC FLIP CHIP BOND PAD DRC (CALIBRE) COMMAND FILE FOR Al PAD | 2.0A / 06/25/2002 | | OBSOLETE (10/08/2002) |
| Select All | Unselect All | | | | |

[Update Version]   [Add More Documents]   [Delete]   [BOD Overview]

*FIG. 5C*

| | | | |
|---|---|---|---|
| ☐ | RC(RC Extraction) | T-013-L0-SP-004-B1<br>TSMC 0.13UM LOGIC 1P8M SALICIDE 1.2V/2.5V FSG IMD RC (STAR-RCXT) TECH.FILE | 1.3A<br>05/23/2002 | |
| ☐ | RC(RC Extraction) | T-013-L0-SP-004-F1<br>TSMC 0.13UM LOGIC 1P8M SALICIDE 1.2V/2.5V FSG IMD RC (FIRE&ICE) TECH.FILE | 1.3E<br>10/11/2002 | RE-TAR THE CORRECT 1P6M ICE FILE INTO THE TECH. FILE SET |
| ☐ | RC(RC Extraction) | T-013-L0-SP-004-H1<br>TSMC 0.13UM LOGIC 1P8M SALICIDE 1.2V/2.5V FSG IMD RC (HYPEREXTRACT)TECH.FILE | 1.3A<br>04/04/2002 | |
| ☐ | RC(RC Extraction) | T-013-L0-SP-004-Q1<br>TSMC 0.13UM LOGIC 1P8M SALICIDE 1.2V/2.5V FSG IMD RC (COLUMBUS) TECH FILE (3RD PARTY) | 1.2A<br>10/29/2001 | *NOTE: 3RD PARTY* |
| | 260<br>SPICE Models | T-013-L0-SP-004<br>TSMC 0.13UM LOGIC 1P8M SALICIDE 1.2V/2.5V FSG IMD SPICE MODEL(CL013G) | 1.3<br>03/06/2002 | |
| ☐ | RC(RC Extraction) | T-013-L0-SP-004-R1<br>TSMC 0.13UM LOGIC 1P8M SALICIDE 1.2V/2.5V FSG IMD RC (RAPHAEL_NES) TECH.FILES(CL013G) | 1.3B<br>07/24/2002 | MODIFY LAYER NUMBER OF OD TO 6 & TEXT LAYER NUMBER OF GATE POLY TO 149 |
| ☐ | RC(RC Extraction) | T-013-L0-SP-004-U2<br>TSMC 0.13UM LOGIC 1P8M SALICIDE 1.2V/2.5V FSG IMD RCX (ASSURA) COMMAND FILE(3RD PARTY) | 1.3B<br>09/05/2002 | *NOTE: 3RD PARTY* CADENCE MODIFIED THE CONTENT |
| ☐ | RC(RC Extraction) | T-013-L0-SP-004-X1<br>TSMC 0.13UM LOGIC 1P8M SALICIDE 1.2V/2.5V FSG IMD RC | 1.3A<br>05/23/2002 | |

*FIG. 5D*

DocuFast – BOD Overview

- DocuFast
  - Self-Guided Navigation
    - BOD Overview
    - Technology Selection
    - BOD Construction
    - BOD Maintenance Company Name: DocuFast Corporation
User Name: Tina Lan

| View Tech Doc | Technology Fact Sheet | Create New BOD | Delete BOD |
| View Library | Library Information | Share BOD | Save As |

⬤ Obsolete  ⬤ Version Conflict  ⬤ New Version  NEW ⟨ New Release  [R] Recommended by TSMC

BOD Dashboard

| Owner ▲▼ | BOD ▲▼ Description ▲▼ | Date Created ▲▼ | ECN | Technology | Library |
|---|---|---|---|---|---|
| ⦿ Lan Tina | 0.25um Logic General Purpose | 11/06/02 | | 0.25um Logic General Purpose 1P5M 2.5V / 3.3V AI | TSMC |
| | 0.25um Logic General Purpose | | | | |
| ○ Lan Tina | 0.18um Logic General Purpose 1P6M | 11/06/02 | 220 ⬤ | 0.18um Logic General Purpose 1P6M 1.8V / 3.3V AI | TSMC ProviderA |
| | 0.18um Logic General Purpose 1P6M 1.8V/3.3V AI | | [R] NEW | | |
| ○ Fourth Morris | 0.15um Logic Low Voltage | 10/02/02 | | 0.15um Logic Low Voltage 1P7M 1.2V / 3.3V AI | TSMC |
| | 0.15um Logic Low Voltage 1P7M 1.2V / 3.3V AI | | | | |

*FIG. 6A*

| | |
|---|---|
| BOD Name | 0.25um Logic General Purpose |
| BOD Description | 0.25um Logic General Purpose |
| Technology | 0.25um Logic General Purpose 1P5M 2.5V / 3.3V Al |
| [ Download Fact Sheet in CSV Format ] | *Confidential & Proprietary* |

[Printer-Friendly Format] [Close]

OVERVIEW ▼

| | |
|---|---|
| Technology | Logic |
| Geometry | 0.25um |
| Device Application | General Purpose |
| Core Voltage (V) | 2.5 |
| I/O Voltage (V) | 3.3 |
| Poly Layers | 1 |
| Metal Layers (Min) | 3 |
| Metal Layers (Max) | 5 |
| RO Speed (ps/gate) | 41 |

PROCESS FEATURE ▶
DEVICE CHART (CORE) ▶
DEVICE CHART (I/O) ▶
MS/RF PROCESS MODULE ▶
BIT DEVICE ▼

| | |
|---|---|
| Hfs | N/A |
| VA(V) | N/A |
| BV ceo(V) | N/A |
| Pt(GHz) | N/A |
| Fmax(GHz) | N/A |
| Ipeak(mA) | N/A |

[Printer-Friendly Format] [Close]

*FIG. 6B*

| | |
|---|---|
| 🖹 DocuFast – Microsoft Internet Explorer | |

[ Printer-Friendly Format ]  [ Close ]

| | |
|---|---|
| BOD Name | 0.25um Logic General Purpose |
| BOD Description | 0.25um Logic General Purpose |
| Technology | 0.25um Logic General Purpose 1P5M 2.5V / 3.3V Al |
| [ Download Fact Sheet in CSV Format ] | *Confidential & Proprietary* |

OVERVIEW ▼

| | |
|---|---|
| Technology | Logic |
| Geometry | 0.25um |
| Device Application | General Purpose |
| Core Voltage (V) | 2.5 |
| I/O Voltage (V) | 3.3 |
| Poly Layers | 1 |
| Metal Layers (Min) | |
| Metal Layers ( | |
| RO Speed (ps | |
| PROCESS FEATU | |
| DEVICE CHART | |
| DEVICE CHART | |
| MS/RF PROCES | |
| BIT DEVICE ▼ | |
| Hfs | |
| VA(V) | |
| BV ceo(V) | |
| Pt(GHz) | |
| Fmax(GHz) | |
| Ipeak(mA) | |

File Download ✕

You have chosen to download a file from this location.

...1052155210571115153306.csv from ecltest8.tsmc.com

What would you like to do with this file?

○ Open this file from its current location

⦿ Save this file to disk

☑ Always ask before opening this type of file

[ OK ] [ Cancel ] [ More Info ]

*FIG. 6C*

DocuFast - BOD

BOD Name: 0.25um Logic General Purpose
BOD Description: 0.25um Logic General Purpose
Technology: 0.25um Logic General Purpose 1P5M 2.5V / 3.3V Al

- DocuFast
- Self-Guided Navigation
- BOD Overview [Edit]
- Technology Selection
- BOD Construction
- BOD Maintenance I would like to receive Engineering Change Notification (ECN) for this BOD: Yes 🌐 Obsolete   ● Version Conflict   🌐 New Version   [R] Recommended by TSMC NOTE: Document download privilege follows logon user's Online privilege setting!

[ Download BOD in CSV Format ]

Technical Document | Library

| Status | Doc Type | Document Number / Description | Current Ver. / Eff. Date | New Version / Eff. Date | Remark |
|---|---|---|---|---|---|
| Select All | Unselect All | | | | |
| 0.25um Logic General Purpose 1P5M 2.5V / 3.3V Al | | | | | |
| ☐ | Brief Design Rule | T-025-LO-DR-008<br>0.25UM LOGIC (1P5M, 2.5V/3.3V) SALICIDE PROCESS BRIEF DESIGN RULE | 1.1<br>12/04/1997 | | |
| ☐ | DRC Command File | T-000-LO-DR-001-D1<br>TSMC AL BOND PAD DRC(DRACULA) COMMAND FILE | 2.2A<br>12/21/2001 | | |
| ☐ [R] | PCM Spec | T-025-LO-PC-099<br>TSMC 0.25UM LOGIC 1P5M SALICIDE 2.5V/3.3V PCM SPIC 123 | 1.0<br>10/07/2002 | | Recommended documents by TSMC, please refer it. |
| Select All | Unselect All | | | | |

[ Update Version ]  [ Add More Documents ]  [ Delete ]  [ BOD Overview ]

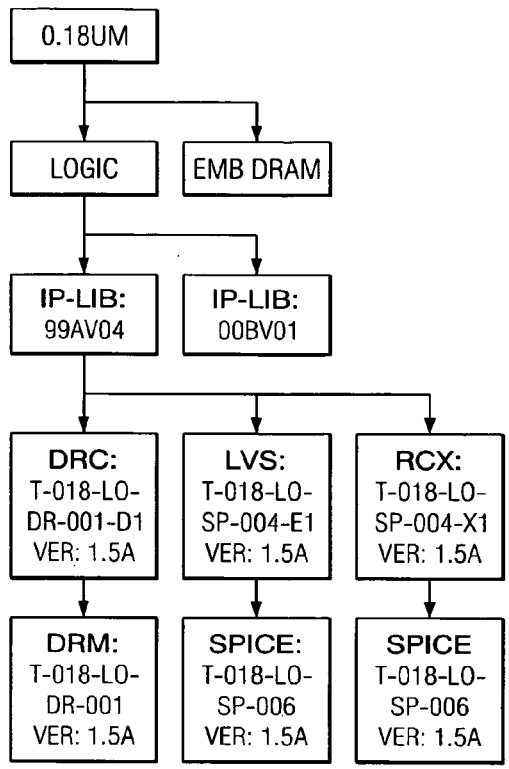
FIG. 11A
STANDARD BOD FOR CUSTOMER SELECTION:
0.18 um:
-LOGIC ☐
--IP-Lib, Ver 99AV04............ ☐
---DRC: T-018-LO-DR-001-D1.. ☐
----DRM: T-018-LO-DR-001..... ☐
---LVS: T-018-LO-SP-004-E1.....☐
----SPICE: T-018-LO-SP-006..... ☐
---RCX: T-018-LO-SP-004-X1.... ☐
----SPICE: T-018-LO-SP-006..... ☐
--IP-Lib, Ver 00BV01............ ☐
-Emb DRAM ☐
--...
---...
FIG. 11B
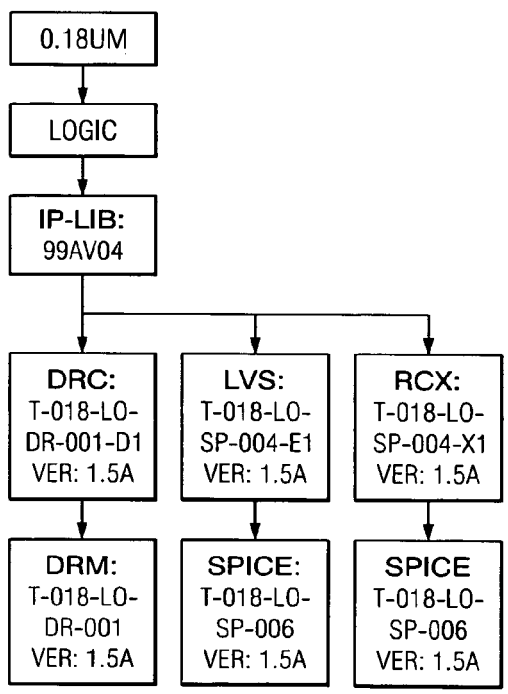
FIG. 12A
STANDARD BOD FOR CUSTOMER SELECTION:
0.18 um:
-LOGIC ☒
--IP-Lib, Ver 99AV04............ ☒
---DRC: T-018-LO-DR-001-D1.. ☒
----DRM: T-018-LO-DR-001..... ☒
---LVS: T-018-LO-SP-004-E1.....☒
----SPICE: T-018-LO-SP-006..... ☒
---RCX: T-018-LO-SP-004-X1.... ☒
----SPICE: T-018-LO-SP-006..... ☒
--IP-Lib, Ver 00BV01............ ☐
-Emb DRAM ☐
--...
---...
FIG. 12B

| | | | |
|---|---|---|---|
| ☐ | RC(RC Extraction) | T-013-LO-SP-004-F1<br>TSMC 0.13UM LOGIC 1P8M SALICIDE 1.2V/2.5V FSG IMD RC (FIRE&ICE) TECH.FILE | 1.3E<br>10/11/2002 | RE-TAR THE CORRECT 1P6M ICE FILE INTO THE TECH. FILE SET |
| ☐ | RC(RC Extraction) | T-013-LO-SP-004-H1<br>TSMC 0.13UM LOGIC 1P8M SALICIDE 1.2V/2.5V FSG IMD RC (HYPEREXTRACT)TECH.FILE | 1.3A<br>04/04/2002 | |
| ☐ | RC(RC Extraction) | T-013-LO-SP-004-Q1<br>TSMC 0.13UM LOGIC 1P8M SALICIDE 1.2V/2.5V FSG IMD RC (COLUMBUS) TECH FILE (3RD PARTY) | 1.2A<br>10/29/2001 | *NOTE: 3RD PARTY* |
| | 260 SPICE Models | T-013-LO-SP-004<br>TSMC 0.13UM LOGIC 1P8M SALICIDE 1.2V/2.5V FSG IMD SPICE MODEL(CL013G) | 1.3<br>03/06/2002 | |
| ☐ | RC(RC Extraction) | T-013-LO-SP-004-R1<br>TSMC 0.13UM LOGIC 1P8M SALICIDE 1.2V/2.5V FSG IMD RC (RAPHAEL_NES) TECH.FILES(CL013G) | 1.3B<br>07/24/2002 | MODIFY LAYER NUMBER OF OD TO 6 & TEXT LAYER NUMBER OF GATE POLY TO 149 |
| ☐ | RC(RC Extraction) | T-013-LO-SP-004-U2<br>TSMC 0.13UM LOGIC 1P8M SALICIDE 1.2V/2.5V FSG IMD RCX (ASSURA) COMMAND FILE(3RD PARTY) | 1.3B<br>09/05/2002 | *NOTE: 3RD PARTY* CADENCE MODIFIED THE CONTENT |
| ☐ | RC(RC Extraction) | T-013-LO-SP-004-X1<br>TSMC 0.13UM LOGIC 1P8M SALICIDE 1.2V/2.5V FSG IMD RC | 1.3A<br>05/23/2002 | |

SYSTEM, METHOD, AND USER INTERFACE PROVIDING CUSTOMIZED DOCUMENT PORTFOLIO MANAGEMENT

This application is a continuation-in-part of claims the priority benefit of commonly owned U.S. patent application having Ser. No. 10/307,180 entitled SYSTEM, METHOD AND USER INTERFACE ALLOWING CUSTOMIZED PORTFOLIO MANAGEMENT filed on Nov. 29, 2002, which is hereby incorporated by reference.

This application is a continuation-in-part of and claims the priority benefit of commonly owned U.S. patent application having Ser. No. 10/321,139 entitled CUSTOMIZED DESIGN PORTFOLIO INTEGRATING IP LIBRARIES AND TECHNOLOGY DOCUMENTS filed on Dec. 16, 2002, which is hereby incorporated by reference.

CROSS REFERENCE TO RELATED APPLICATION

This application is also related to a commonly owned U.S. patent application having Ser. No. 10/340,216 entitled CUSTOMIZED DOCUMENT PORTFOLIO SYSTEM INTEGRATING IP LIBRARIES AND TECHNOLOGY DOCUMENTS filed on Jan. 10, 2003, and which is hereby incorporated by reference.

TECHNICAL FIELD

The present invention generally relates to web-based document management. In one aspect, it relates to a system, a method, and user interface providing customized portfolio management of documents regarding integrated circuit design and production.

BACKGROUND

The design of an integrated circuit (IC) typically includes the production of a schematic representation showing the circuit elements (often termed "cells") for each functional unit of the IC and the interconnections between the elements. The schematic is typically translated into a physical layout that is a geometric representation of the circuit, composed of polygons and interconnecting paths. The layout specifies the position and relative dimensions of the layers of materials deposited on a silicon wafer to form the circuit elements and interconnections, for example.

In addition to the correspondence between a schematic and the physical layout, it is also necessary that the integrated circuit design be consistent with the fabrication process, e.g., technology, equipment, and capability. The IC fabrication process at a given foundry may differ from that at other foundries. For example, a more advanced fabrication facility may fabricate an IC with interconnections having narrower line widths and smaller spaces between adjacent features than a less advanced facility. Depending on the foundry's fabrication technologies and techniques, and the materials used, different physical geometric configuration constraints apply. These constraints are commonly referred to as "design rules." Design rules may include, for example, dimensional specifications for the layout of a design, such as minimum spacing between transistors, minimum separation between conductors to prevent shorting, minimum metal width, contact size and spacing between the contacts, and minimum transistor length and width. Hence in the process' early stages, IC designers often need to access technology documents regarding foundry fabrication and design rules.

Presently, IC fabrication is highly developed and a semiconductor foundry may provide their customers with various technology choices and process options. Foundries usually provide numerous technology documents with respect to several geometries (e.g., 0.35 μm, 0.25 μm, 0.22 μm, 0.18 μm, 0.15 μm, 0.13 μm, etc.) and various products (e.g., logic products, MS/RF, embedded flash, etc.). One feature of the technology documents is that some may subordinate others. Thus, when a document is amended, its related documents often must also be updated correspondingly, to prevent version conflicts.

Technology documents may be delivered in several ways. One way is to assign customer service representatives to monitor the status of documents for customers and manually forward documents to customers upon request. This way is often very labor intensive, slow, and/or subject to human errors and oversight.

As a second way, some foundries may provide all technology documents for customers at an FTP site, but without linking the documents together based on their relationships to each other. Often a single document may be related to numerous other documents, and may be applicable to numerous geometry sizes and/or product types. Also, some foundries may not sort documents by the geometry size or by product type. In such cases a customer may be left to sort through, gather, and organize the documents they need in quite an inefficient manner.

A third possible way entails a foundry providing the latest set, i.e., synchronized version, of all design related documents online for customer access. A disadvantage of this approach is that design customers have to spend time determining which documents related to their design have been changed. Also, there is often no further information provided for the customers to conduct an evaluation of the impact on the original or subsequent design when technology documents have been updated.

Using a fourth way, a foundry may provide the latest technology documents online without version synchronization. The same disadvantages exist as the previous method, in that customers spend time determining which documents relating to their design have been updated. Moreover, because the versions of the documents are not synchronized, the customers have to evaluate the compatibility of the related documents between versions. Conflicting versions can cost a lot of time and money to fix, and even worse, delay new product availability on the market. Therefore, a need exists for an improved way to manage documents provided by a foundry to its customers.

SUMMARY OF THE INVENTION

In accordance with one aspect of the present invention, a system and method allowing IC designers to easily create their own portfolios of selected technology documents regarding their design is provided. Another aspect of the invention provides web-based user interface allowing IC designers to easily maintain and monitor their own portfolios of technology documents. Still another aspect of the invention provides customized and verified design related documents, with respect to a specific technology, for IC designers. Yet another aspect of the invention provides a notification mechanism to indicate document status, such as which documents have been updated and version compatibility thereof.

A preferred embodiment of the present invention, therefore, provides a customized portfolio management system, comprising: a document metadata database storing classified documents and meta information thereof, a document repository management server programmed as security engine, rule engine, search engine and notification engine, and a Web server providing an interactive website displaying the classified documents from which a terminal user can compile a customized portfolio.

The security engine preferably authenticates user identification when a terminal user logs on the website, and searches the document metadata database according to a selection on the website to create the customized portfolio. The rule engine preferably identifies document status in the document metadata database. The notification engine preferably monitors the status of the customized portfolio, and sends notification when the status changes. In addition, the management server may further provide a sharing engine allowing users to share a customized portfolio with other users with pre-defined privileges.

In accordance with another aspect of the present invention, a method for customized portfolio management is provided. One feature of the method is provision of a website that includes a browsable catalog of documents and allows users to create their own customized portfolio by selecting required documents. Another feature allows monitoring of document status in the customized portfolio by sending notifications when the status of any document in the portfolio is changed. Accordingly, a service for online creation, maintenance, administration and monitoring of a customized portfolio of technology documents is preferably achieved. In addition, web-based user interfaces may also be provided with indicators to notify portfolio owners of the document status changes in the portfolio.

In accordance with another aspect of the present invention, a user interface for document portfolio management is provided. The user interface includes a column listing at least one portfolio. The user interface also includes a notification column corresponding to each portfolio. The user interface further includes an on-screen selection button corresponding to each portfolio for selecting a corresponding portfolio, and an on-screen button for invoking a displaying of a selected portfolio. An indicator appears in the notification column when the status of a document in the portfolio has changed.

In accordance with still another aspect of the present invention, a user interface for document portfolio management is provided. The user interface includes a column listing at least one document of a portfolio, and a notification column corresponding to each listed document. The user interface also includes an on-screen selection button corresponding to each listed document for selecting a corresponding document, and an on-screen button for invoking an action for a selected document. An indicator appears in the notification column when the status of a document in the portfolio has changed.

In accordance with yet another aspect of the present invention, a method of providing a group of related documents, is provided. In this method, a group of technical identification codes are provided. Each technical identification code is unique and represents a certain combination of technical parameters (e.g., geometry, application, technology, voltage, etc.). At least one of the technical identification codes is assigned to each of a plurality of documents in a database. There may be other documents in the database outside the plurality of documents that do not receive a technical identification code. A certain technical identification code is selected from the group of codes. The certain technical identification code is one that has been assigned to at least one of the plurality of documents. Documents within the database are searched for in the database which have the certain technical identification code assigned thereto. The documents found in the searching are grouped into a first group of documents. The documents of the first group of documents are related via the certain technical identification code assigned thereto.

A listing of the first group of documents is preferably provided to a user on a user interface. The user interface may be provided on a website via the Internet, for example. The method preferably allows the user to select documents from the first group of documents to create a customized group of documents via the user interface, and preferably allows the user to save the customized group of documents on a server via the user interface. The method preferably allows the user to add documents to and delete documents from the customized group of documents as needed via the user interface. In a preferred embodiment, the method may monitor status of documents in the customized group of documents for status changes. The status changes may be for a new document version available, a document version conflict among related documents, and/or an obsolete document present in the customized group of documents, for example. Preferably, the user is notified of a detected status change for one or more documents in the customized group of documents. Such notifying may be performed by sending an e-mail message to the user and/or by providing a color-coded indicator on a user interface for the user. In a preferred embodiment, a link is provided on a user interface for directing the user to an appropriate document corresponding to the detected status change.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A to 2E illustrate preferred user interfaces for allowing a user to create a customized portfolio in accordance with a preferred embodiment of the present invention;

FIGS. 3A to 3C illustrate preferred user interfaces for allowing sharing of a created portfolio in accordance with a preferred embodiment of the present invention;

FIGS. 4A to 4D illustrate preferred user interfaces allowing monitoring, managing and creating a customized portfolio in accordance with a preferred embodiment of the present invention;

FIGS. 5A to 5D illustrate preferred user interfaces allowing document version monitoring, updating, and deleting in accordance with a preferred embodiment of the present invention;

FIGS. 6A to 6C illustrate preferred user interfaces allowing authorized users to download a technology fact sheet in accordance with a preferred embodiment of the present invention;

FIGS. 7A and 7B illustrate preferred user interfaces allowing authorized users to download a customized portfolio in accordance with a preferred embodiment of the present invention;

FIGS. 11A to 11B illustrate the standard BOD of FIG. 9;

FIGS. 12A to 12B illustrate the customized BOD of FIG. 9;

FIG. 13 illustrates a preferred user interface for use by a system administrator at a foundry in accordance with a preferred embodiment of the present invention; and FIGS. 14A to 14B illustrate a preferred user interface for use by a customer in accordance with a preferred embodiment of the present invention.

DETAILED DESCRIPTION OF ILLUSTRATIVE EMBODIMENTS

Figure 1:
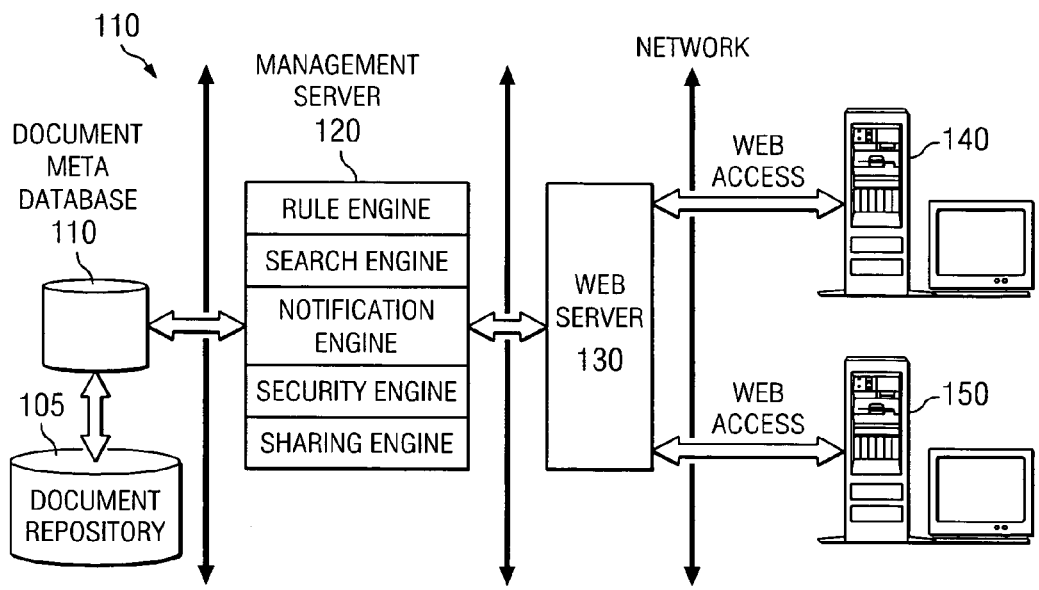
FIG. 1 illustrates a general architecture of a customized document portfolio management system that operates in accordance with a preferred embodiment of the present invention.

FIG. 1 illustrates the general architecture of a customized document portfolio management system 100 of a preferred embodiment of the present invention. A service allowing customizing and monitoring a portfolio of technology documents provided by a semiconductor foundry is described as an example embodiment. The customized portfolio management system 100 includes a document metadata database 110, a document repository management server 120, and a web server 130. Although shown as separate components for purposes of illustration in FIG. 1, the components 105, 110, 120, 130 on the server side of the system architecture 100 may be included within a single machine at a single location, these components 105, 110, 120, 130 may be combined in any number of groups, and/or these components 105, 110, 120, 130 may be located in different machines at different locations. Also, these components 105, 110, 120, 130 may be part of a larger system, of which the other components are not show herein.

Technology documents created by a semiconductor foundry may be stored in a repository database 105, for example. As described in more detail below, the technology documents then are preferably classified and stored in the meta document database 110 and meta information about the classified documents is also preferably stored in the meta document database 110 accordingly. Preferably, the technology documents are classified based on geometry and product application.

The management server 120 is communicably coupled to the document metadata database 110. The management server 120 may include a security engine module, a rule engine module, a search engine module, a notification engine module and a sharing engine module, for example. The web server 130 is communicably coupled to the management server 120. The web server 130 preferably provides a website and graphical user interfaces (UI) for clients (e.g., users or design customers) 140 or 150. The clients may be communicably coupled to the web server 130 via communications network (public or private, and preferably secure using encryption technology). Preferably, a user at a client may interactively access the system 100 via a web browser (e.g., Microsoft Explorer, Netscape Navigator, Opera). Users at a client 140 or 150 may be IC design customers authorized by the foundry to access the website, for example. The clients may also be automated or semi-automated computer systems using software to communicate with and log into the web server to check and/or receive status updates and/or documents, for example.

In a preferred embodiment, the web server 130 provides a site and specific user interfaces with specific functionalities allowing customers and users to build, monitor, and maintain their own design portfolio from numerous technology documents. In typical operation, an authorized IC designer 140 or 150 accesses a website provided by the web server 130 using a standard web browser to communicate with the web server 130. The security engine preferably authenticates the identification of terminal users comparing with predetermined customer information provided by the foundry. For a new device or component design, e.g., a new semiconductor product, the website provides an interactive user interface allowing the authorized designer to create a new and customized document portfolio for the new design. The management server 120 accesses the document metadata database 110 according to the user's request, displaying an overview of the technology documents on the user interface for selection.

Figure 2A:
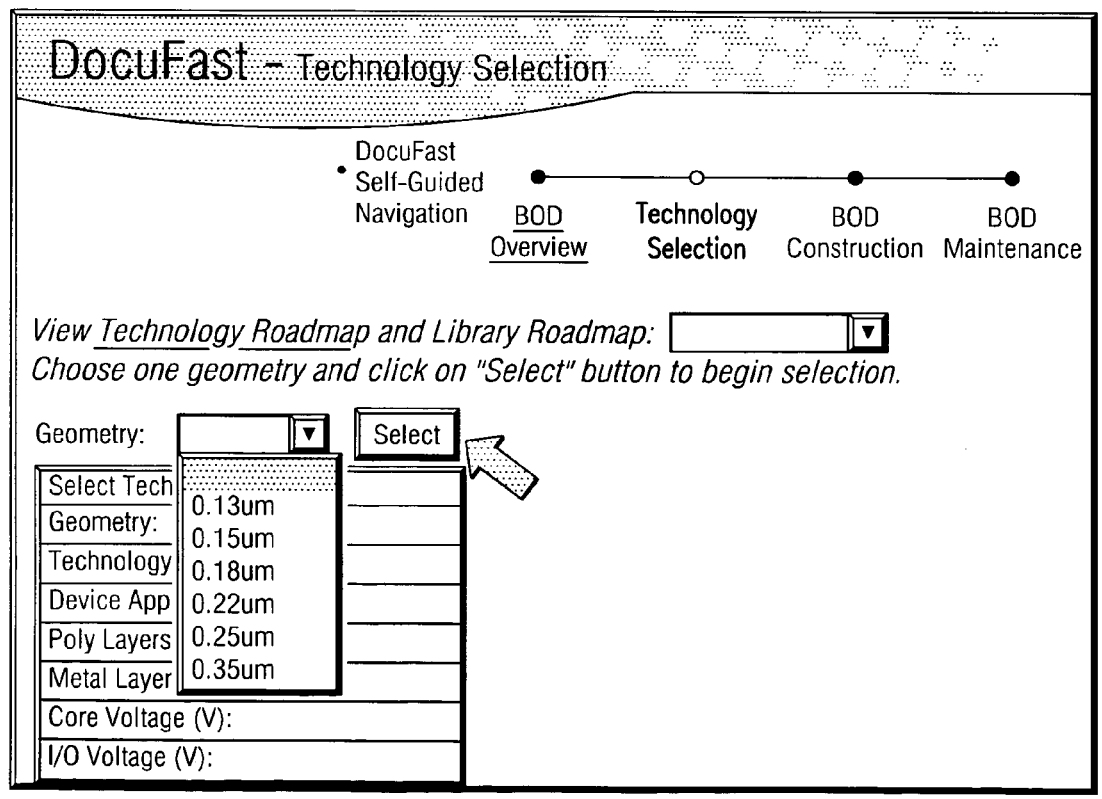
Figure 2B:
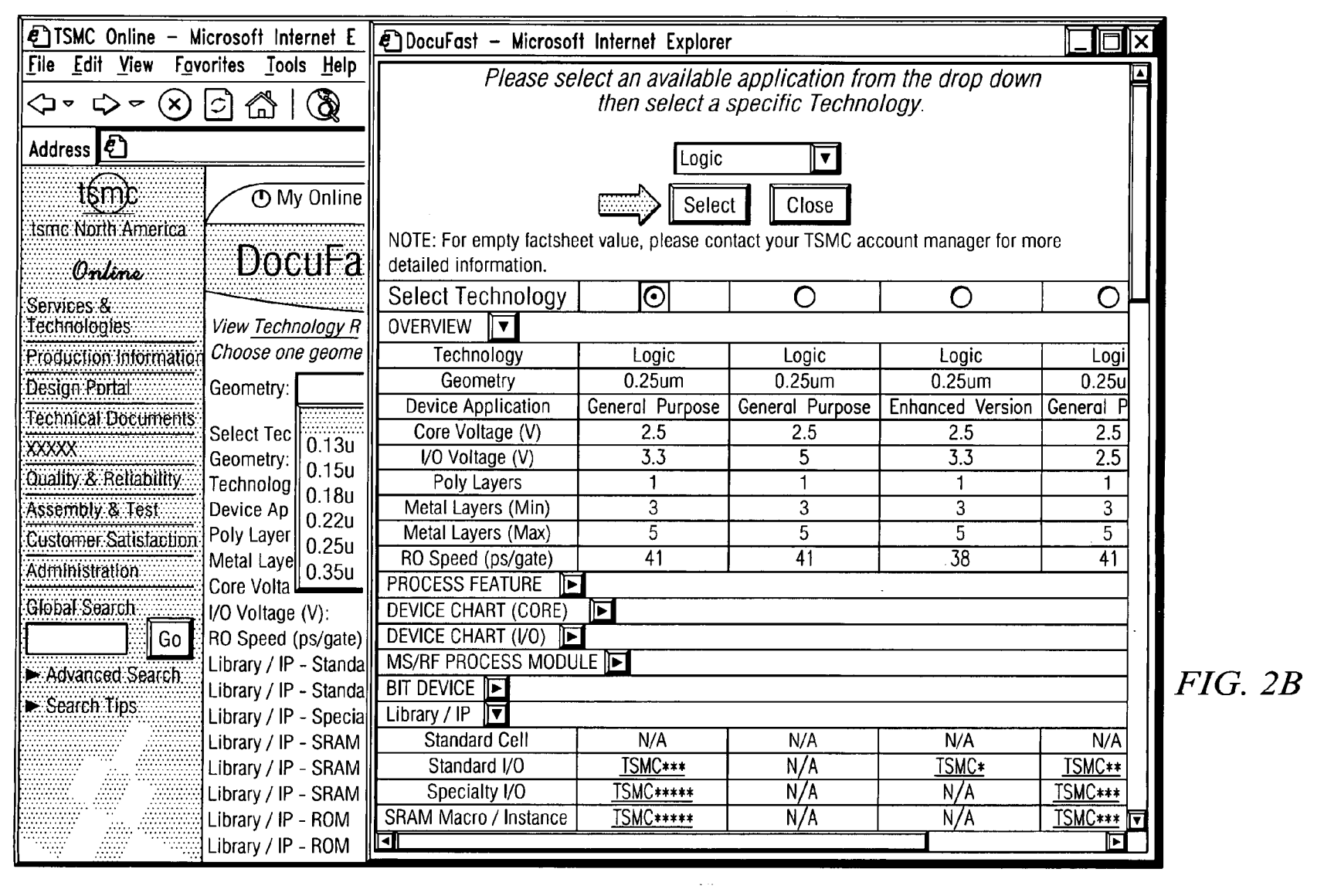

FIGS. 2A to 2E illustrate some preferred user interfaces allowing a customer/user to create a customized document portfolio, i.e., a customized "bill of documents" or BOD. The technology documents have been preliminary classified and stored in the document metadata database 110 according to different technologies, such as geometry levels and IC product characteristics. A preferred user interface is shown in FIG. 2A. As a first step in this embodiment to create a portfolio for a new product, a geometry level is chosen from a dropdown menu. For example, in FIG. 2A a user may choose 0.25 μm from a geometry size list including the sizes of 0.35 μm, 0.25 μm, 0.22 μm, 0.18 μm, 0.15 μm, and 0.13 μm. After that, a user interface appears as shown in FIG. 2B, providing a list of various types of IC products. Available IC product applications (e.g. Logic, MS/RF, CIS, 1TRAM, or EmbFlash, and electrical characteristics) may be chosen from a drop-down menu (see FIG. 2B). Various key electrical characteristics of the chosen product may be listed for further selection, as FIG. 2B shows, for example.

Figure 2D:
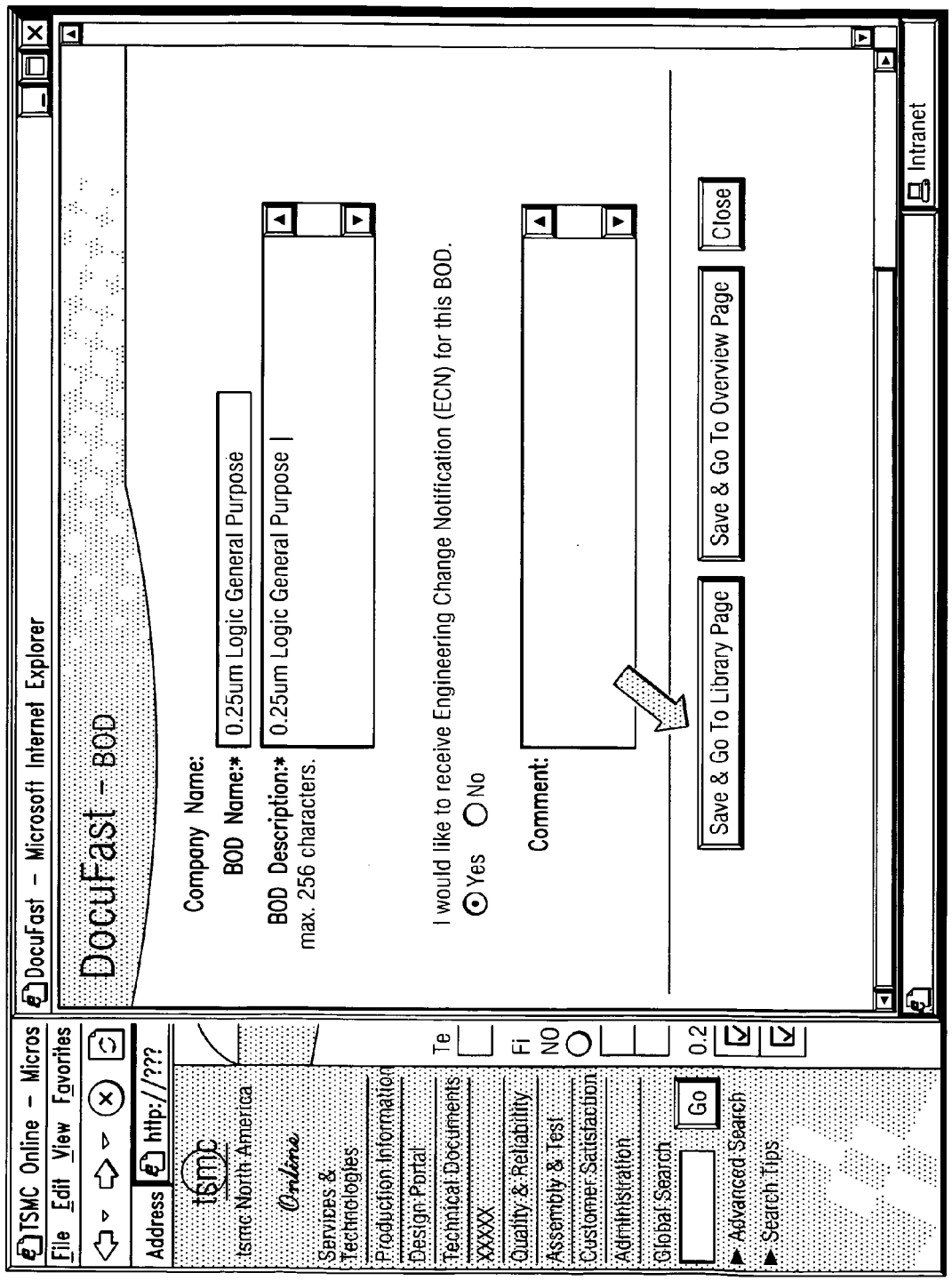
Figure 2E:
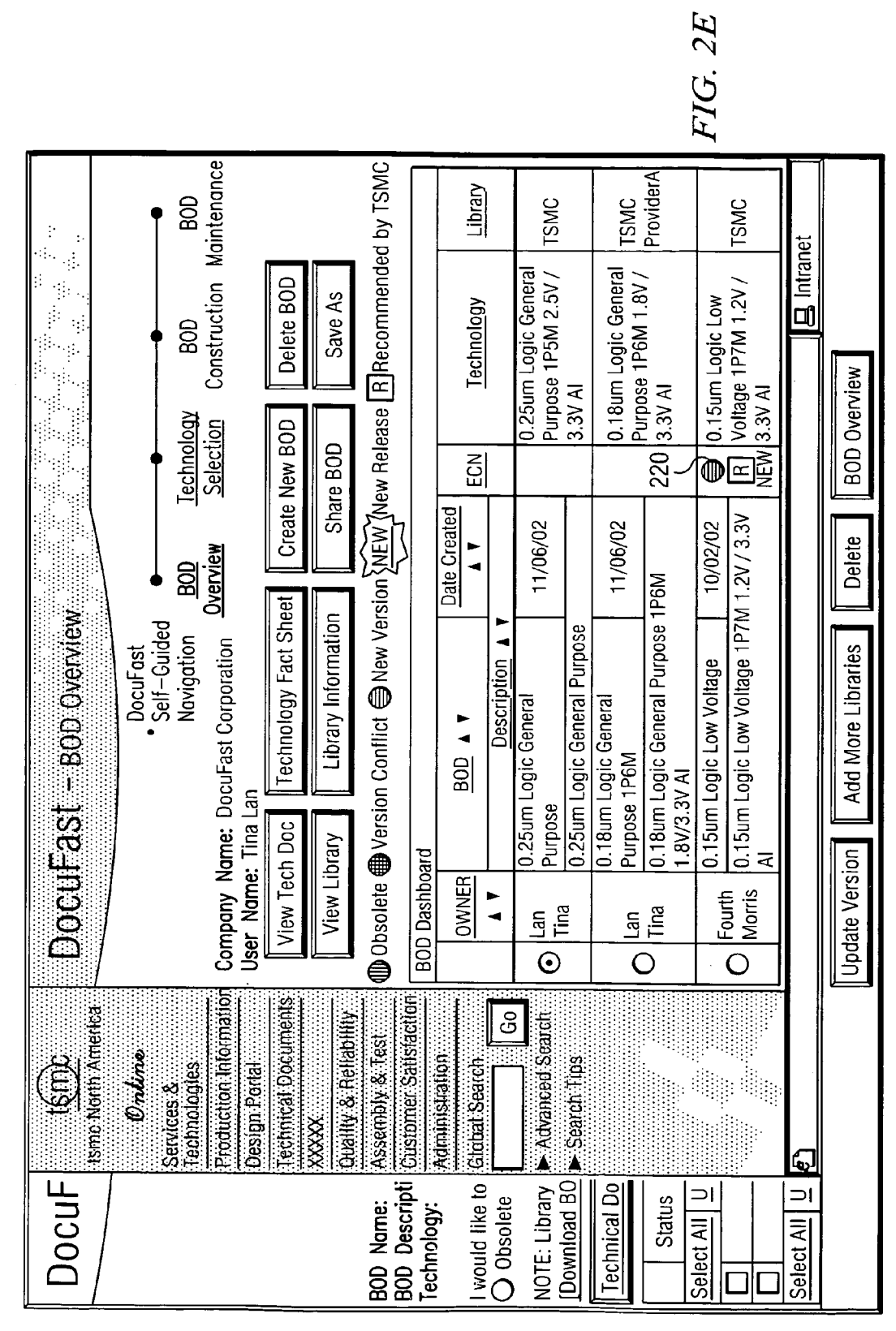

After the technology-related geometry and product application are chosen, the preliminary technology definition is completed. The search engine of the management server 120 accesses the document database 110 according to the technology definition and lists some or all of the related technology documents. FIG. 2C shows a user interface listing all documents related to 0.25 μm Logic design with columns for document type, brief description, version status, and remarks. The designer can select required documents from the list and "Add to BOD" to save the new portfolio/BOD including the checked documents. As shown in FIG. 2D, the web server 130 generates a window for assigning a filename and description of the customized portfolio/BOD. Preferably, the window also allows the user to choose whether to receive Engineering Change Notifications (ECN). The saved portfolio may be then displayed as a control panel, as FIG. 2E shows, which lists all the portfolios this user can view. In addition, an authorized user may also delete an existing portfolio by selecting the "Delete" button in FIG. 2E.

Figure 3B:
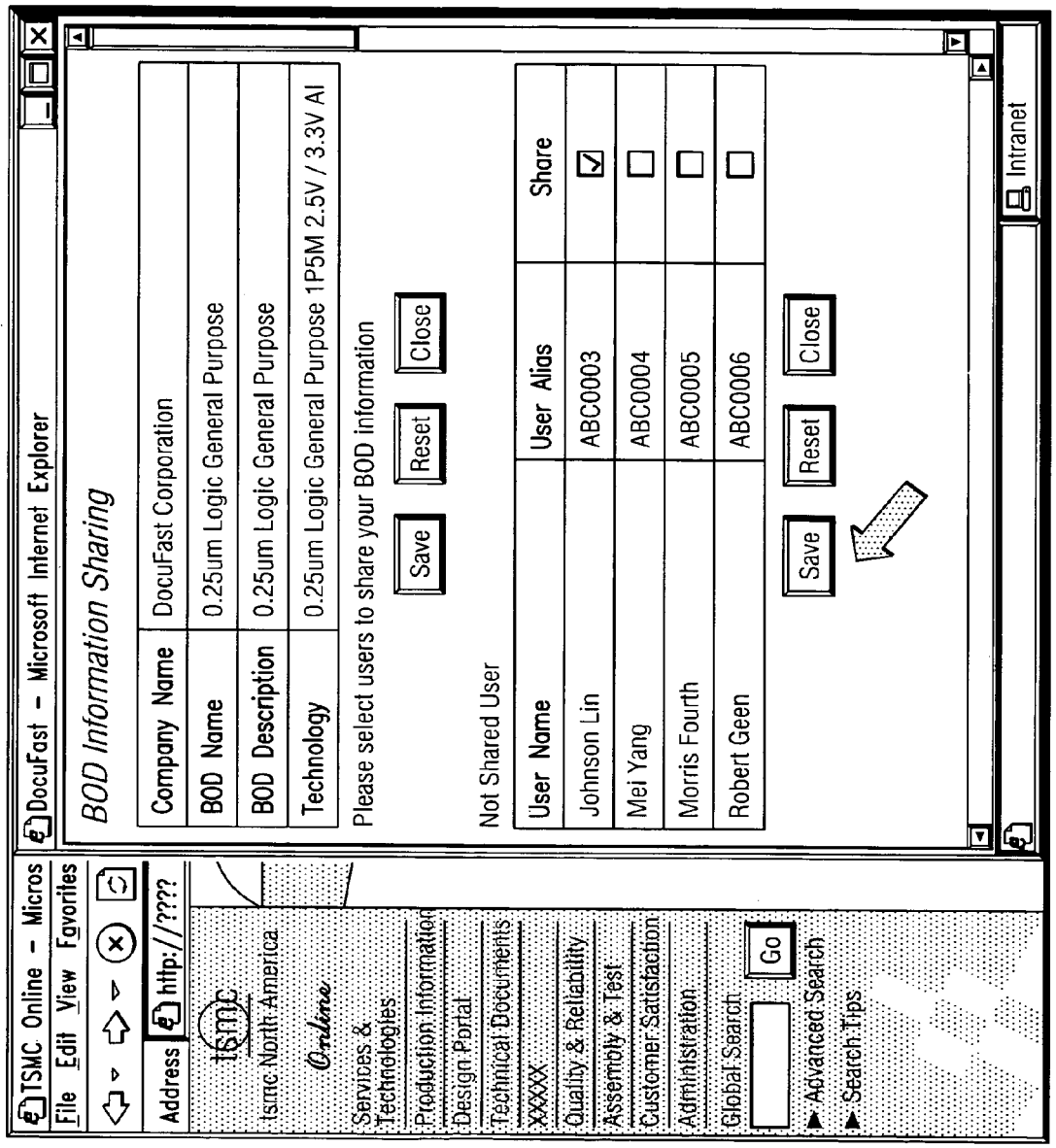

In a preferred embodiment, the website provides sharing of any customized portfolio/BOD to select users. The sharing engine of the management server 120 manages the sharing of a BOD with other authorized users (e.g., team members). FIGS. 3A to 3C show preferred user interfaces for allowing sharing of a portfolio (BOD). For example, a design company may provide a list of team members to the foundry so that, after building a customized portfolio (BOD) as shown in FIG. 3A, a designer can further select "Share BOD" to generate a member list. After a user clicks on the "Share BOD" button, shown in FIG. 3A, another user interface appears as shown in FIG. 3B, and the user may select members (typically and preferably restricted to others in the same company) with which to share the portfolio. Then when a shared user logs onto the website, the user interface displays a control panel showing all shared portfolios for that user (i.e., those that the user has been authorized to access), as shown in FIG. 3C, for example. Preferably, the sharing engine of the management server 120 is programmed such that the shared users can only view shared portfolios, without update, delete, or add privileges. However, in other embodiments, certain shared users may also have authorization to update, delete, or add privileges.

Figure 4A:
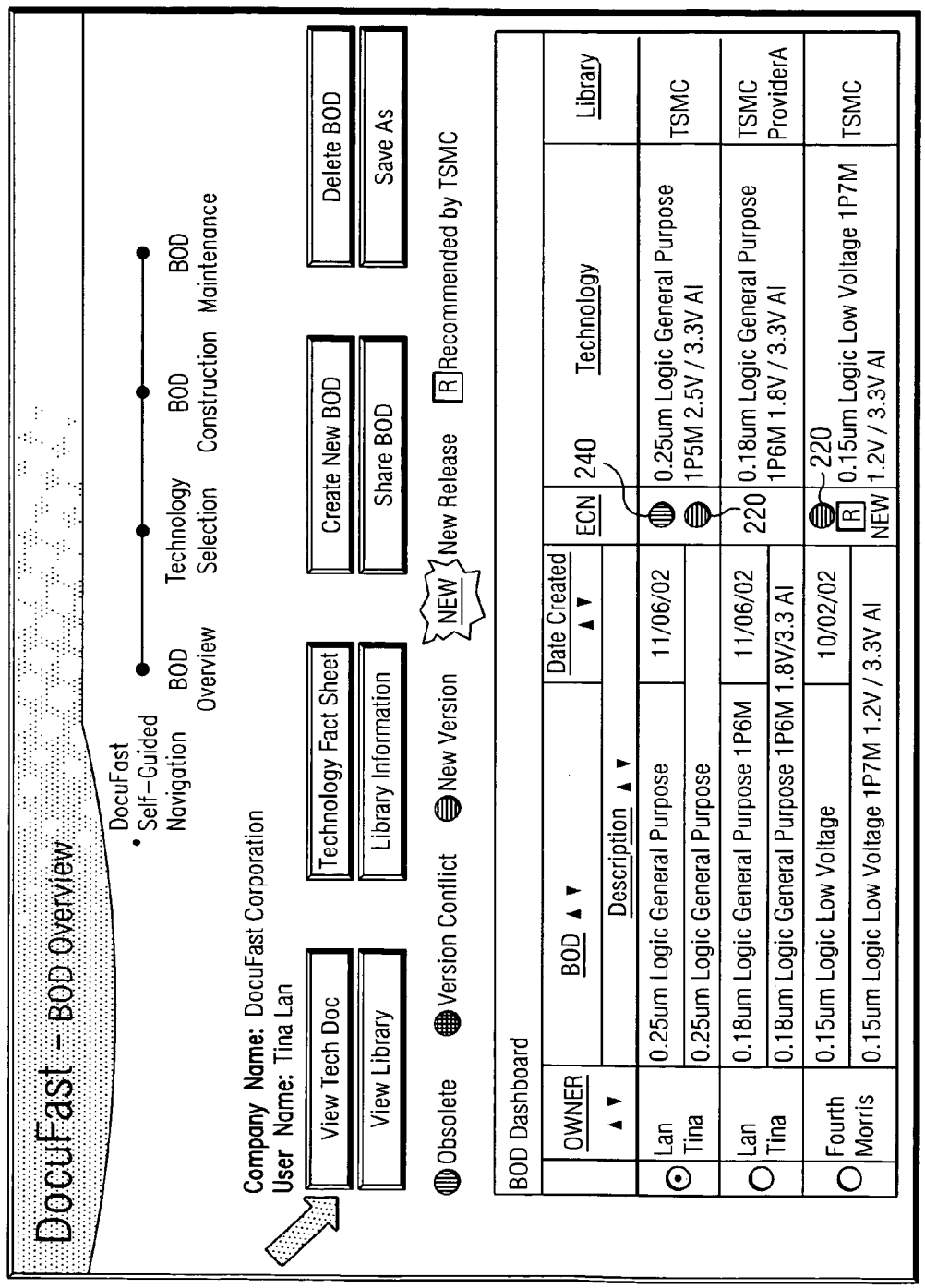

FIGS. 4A to 4D illustrate example user interfaces provided by the customized portfolio system 100 for editing or managing an existing customized portfolio/BOD. As shown in FIG. 4A, one portfolio is selected. With a portfolio selected, if a user then clicks on the "View Tech Doc" button (see FIG. 4A), the chosen portfolio/BOD is displayed, as shown in FIG. 4B, with all selected documents listed. Also other information about each document listed man be shown, such as document types, document number, brief description, current, and new version of documents in the portfolio, as shown in FIG. 4B, for example.

Figure 4C:

As also shown in FIG. 4B, the customized portfolio system 100 of this embodiment allows only authorized users to add, delete, and update technology documents, but not shared users. When an authorized user selects the "Add More Documents" button, a user interface as shown in FIG. 4C provides a list displaying unselected documents regarding the defined technology of the currently viewed portfolio. Available documents are displayed with a check box allowing selection by authorized users. The authorized user can check a box corresponding to a required or desired documents and select "Add to BOD" to save the addition to the currently viewed BOD (see FIG. 4C).

Accordingly, an authorized user can also select the "Delete" button, as shown in FIG. 4B, to delete documents from the currently viewed portfolio. FIG. 4D shows available documents in the portfolio displayed with corresponding check boxes. An authorized user can check documents and select "Delete" button to effect the deletion of an obsolete document, for example, as illustrated in FIG. 4D. Thus, authorized IC designers can easily maintain a customized portfolio regarding a new IC product via the interactive website provided by the web server 130.

Additionally, the customized portfolio system 100 of FIG. 1 provides engineering notification of document status changes. In a preferred embodiment, when a customized portfolio of certain technology documents has been created by an IC design team, the notification engine of the management server 120 monitors the version status of every document in the portfolio. When the selected version of a document in the portfolio is updated, the notification engine sends a notification to the portfolio owner (e.g., design team) by e-mail, for example. The notification engine of a preferred embodiment also provides a notification on certain user interfaces when any authorized team member logs onto the website. The notification engine forwards the portfolio creator and the shared members a notification, e.g. via email, of document obsolescence, version conflict, and/or new version availability within its existing BOD(s). Notifications are also preferably shown on certain user interfaces with corresponding indicators when users access portfolios online (see e.g., FIG. 5A).

Figure 5A:
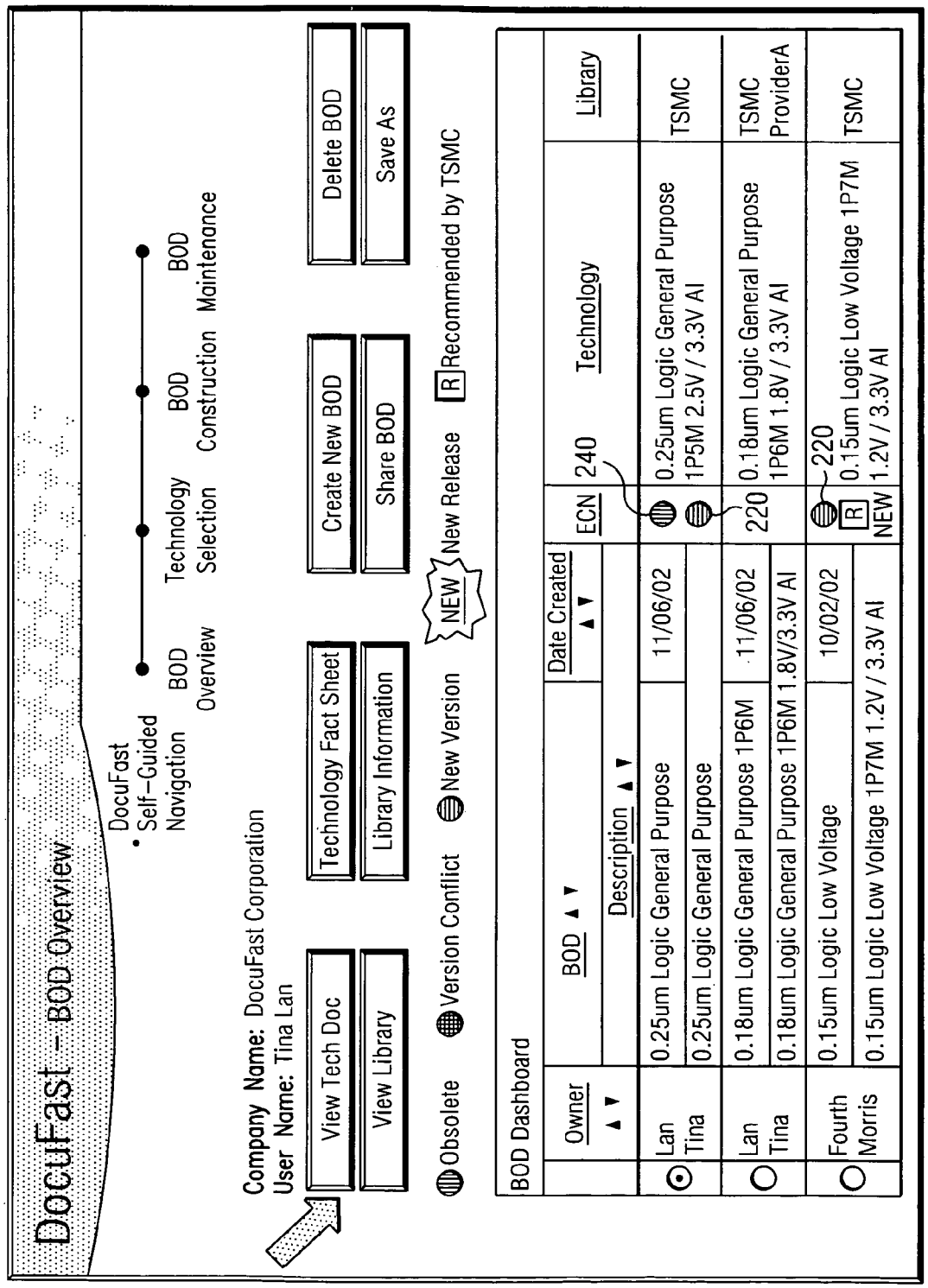

FIGS. 5A to 5C show preferred user interfaces for version monitoring and updating and document deleting. As shown in FIG. 5A, when a user logs onto the website, a list is displayed showing portfolios that the user can access. A column of notification, i.e., the ECN column in FIG. 5A, is displayed indicating visually the status of documents in each portfolio. In a preferred embodiment, a blue light symbol 220 indicates a new version of a document is available. A yellow light symbol 260 indicates version conflict and a red light symbol 240 indicates that at least one document in the portfolio has been made obsolete by the foundry (see FIG. 5A). Hence, with the color-coded indicators, users may easily recognize and notice status changes. The details of document status can be viewed when the user selects a radio button of a portfolio on the list and clicks on the "View Tech Doc" button (i.e., to view that BOD), as shown in FIG. 5A.

Although round light symbols are used in the examples described herein for the indicators, other symbols, shapes, and colors may be used in other embodiments. Also, in other embodiments, sounds may be used in combination with the visual symbols to alert a user of the status change. Also in FIG. 5A, note that a symbol having the letter "R" inside a white box is used as an indicator. This "R" indicator may be used (optionally) to highlight a new or existing document recommended as a preferred choice by the foundry, for whatever reason (e.g., new technology, new process innovation, better integration, cost savings, etc.). Other such indicators may also be used to attract the attention of a user to a particular document or document recommendation for a portfolio/BOD.

As shown in FIG. 5B, the selected portfolio is then displayed in detail with color-coded indicators in the "Status" column representing document status for each document listed. In FIG. 5B, a DRC command file is marked with a blue light indicator 220 to indicate that there is a new version of this DRC command file available from the semiconductor foundry. The version number of the current and the new version are displayed respectively on the table. Optionally, remarks may be included in the "Remark" column of the table to briefly describe the version difference. The current version in the BOD may be updated by an authorized user. In FIG. 5B, an authorized user checks the check box of the document having a new version, and then selects "Update Version". The management server 120 then updates this DRC command file in the portfolio to the latest version and the status column of the DRC command file becomes empty (no indicator).

As shown in FIG. 5C, a red light indicator 240 shows that a document has been made obsolete by the foundry. An authorized user may decide whether to keep or delete the obsolete version. In this embodiment, the authorized user may delete the obsolete document by selecting the check box of the document and then clicking on the "Delete" button (see FIG. 5C). Clicking the "Delete" button allows the management server 120 (see FIG. 1) to receive the command from the web server 130 to remove the obsolete document from the portfolio and disable/remove the red light indicator 240.

In FIG. 5D, one of the documents has a yellow light indicator 260 to indicate a version conflict. Often when a document (e.g., parent document) is modified or revised to create a new version of that document, related documents (e.g., children documents) often are or must be modified correspondingly. One example of a version conflict is when a parent document and correspondingly its child document have been revised or modified, and a user has only updated the parent document with the new version and has not yet updated the child document. In such case, the existing version of the child document in the portfolio does not match that of the parent document, and thus there is a version conflict. In such case, a preferred embodiment would display a yellow indicator 260 and provide a reference to the new version available for the child document, as illustrated in FIG. 5D. Also, optionally, a notification (e.g., a yellow indicator 260) may be placed next to the parent document with a remark that the children of that document have version conflicts needing resolution. Preferably, the system 100 provides such notifications in real-time (or as soon as it is processed) so that the user can know about version conflicts arising from an updating action just performed for a certain document while still viewing and managing the portfolio at that time. Because many documents are typically related with other documents, there may be cases where a new document version is not yet fully synchronized because other related documents are in the process of being updated by the foundry. In such case, the yellow light indicator 260 may then warn designers that a document is now being updated, but is not yet complete, and hence the designers may be able to assess its impact to their design work beforehand.

Preferably, maintenance of the customized portfolio is performed only by authorized users via the website. In a preferred embodiment, shared users can only receive notification e-mails and view the portfolio with indicator notification, with no add, delete, or update privileges. However, in other embodiments, the shared users may have more privileges. For a design team with several members, the key designer will typically manage the customized portfolio and the other shared members will typically view the status of the same portfolio without any modification rights.

In a preferred embodiment, the website server 130 allows authorized users to download a fact sheet and/or document package for each portfolio. FIGS. 6A to 6C illustrate preferred user interfaces allowing authorized users to download the fact sheet.

The user interface in FIG. 6A shows a list of customized portfolio previously created. An authorized user may select a radio button of a certain portfolio listed and then click on the "Technology Fact Sheet" to obtain the fact sheet information for that portfolio. Technology information for the selected portfolio, such as geometry, product type, product characteristics, is then displayed in a popup window, as FIG. 6B shows. The user interface in FIG. 6B allows the user to print or download the fact sheet by selecting "Download Fact Sheet in CSV Format". A prompt window then allows the user to download the file or open it directly, as FIG. 6C shows.

Figure 7B:
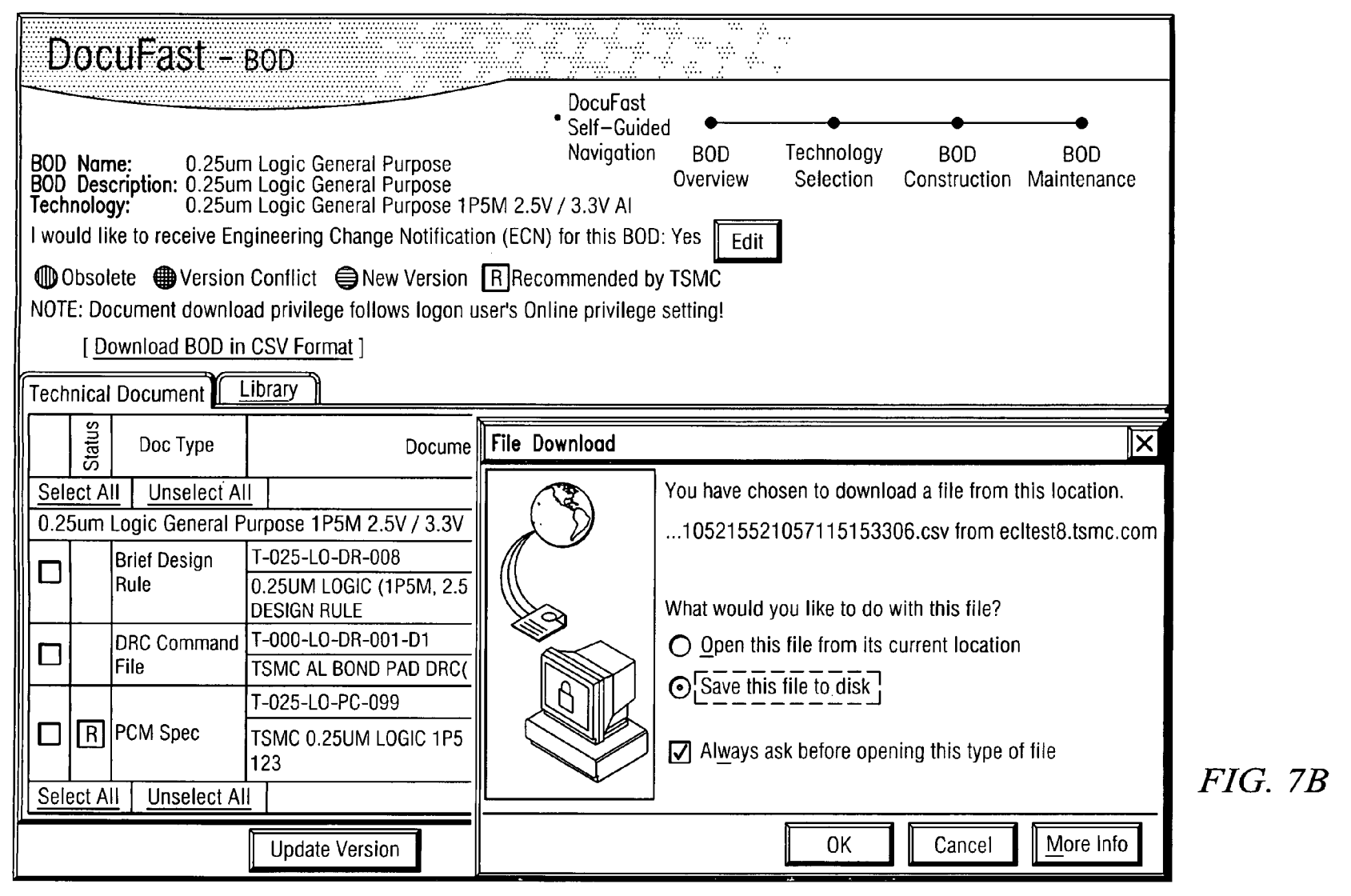

FIGS. 7A and 7B illustrate preferred user interfaces allowing authorized users to download a portfolio/BOD. In FIG. 7A, a selected BOD is displayed listing the documents within it (after the authorized user selects the portfolio and clicks "View Tech Doc", as shown in FIG. 6A for example). In FIG. 7A, the authorized user may select "Download BOD in CSV format" to download the portfolio in a CSV format. Upon doing so, a prompt window appears that allows the user to download the file or open it directly, as FIG. 7B shows.

Figure 8:
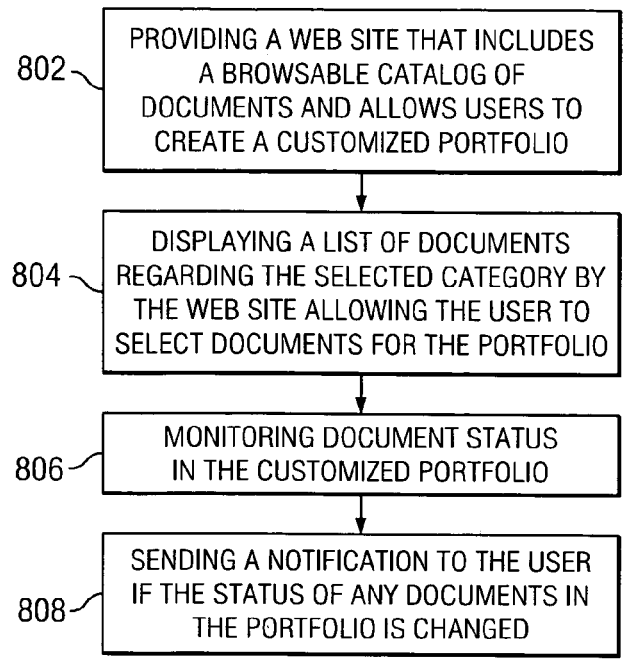
FIG. 8 illustrates a method flow to provide customized portfolio management in accordance with a preferred embodiment of the present invention.

FIG. 8 illustrates a method flow providing customized portfolio management according to a preferred embodiment of the present invention. A website is provided including a browsable catalog of documents classified by technology. The web site allows users to begin creating a customized portfolio by selecting a technology category (see block 802 in FIG. 8). Within the technology category, related documents relevant to that technology category are listed. The documents may be technology documents provided by foundries regarding IC design, for example. All technology documents are preferably pre-classified based on fabrication geometry (e.g., 0.35 μm, 0.25 μm, 0.18 μm, 0.13 μm, etc.) and product characteristics (e.g., logic, MS/RF, 1TRAM, EmbFlash, etc.). A list of documents regarding the selected technology category is displayed by the website, and the website allows a user to select documents for the customized portfolio (see block 804 in FIG. 8).

Document status in the customized portfolio is monitored by the system 100 (e.g., by the foundry) (see block 806 in FIG. 8). In a preferred embodiment, the notification engine (shown in FIG. 1) monitors the document database 110 for the status of the selected documents in the portfolio. If the status of any documents in the portfolio changes, a notification is sent to users associated with the portfolio or to users designated to receive such notices (see block 808 in FIG. 8). Preferably, indicators on the website appear when the user logs onto the website to view changes (see e.g., FIGS. 2E, 3A, 4A, 4D, 5A, 5B, 5C, 5D, 6A, 14A, and 14B). The indicators notify the user of document changes when the user uses the system 100 via a web site.

As discussed above, in one embodiment, a blue indicator 220 may be used to indicate that a new version has been provided by the foundry, a yellow indicator 260 may be used to indicate an incidence of version conflict, and a red indicator 240 may be used to indicate that the document has been made obsolete by the foundry, for example. Thus, the website preferably allows a user to update versions and/or delete obsolete documents from the portfolio based on notification from the corresponding indicators. Authorized users and/or other users may obtain more detailed information of document status changes from a remarks column. Accordingly, the above system and method flow provides IC designers with easy management and monitoring of foundry technology documents regarding their design by creating a customized portfolio. The service for customized portfolio management provided by a preferred embodiment may save design companies time and manpower normally spent managing technology documents and IP libraries.

Figure 10:
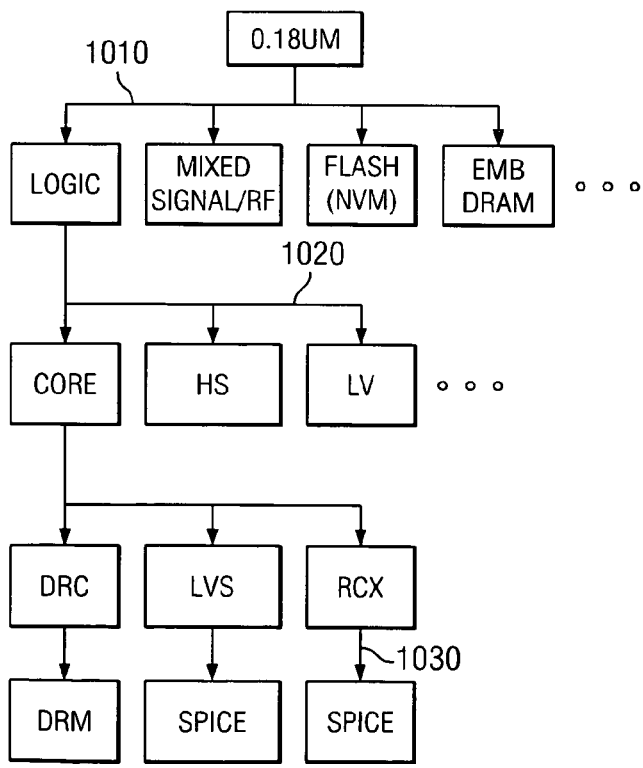
FIG. 10 illustrates the template BOD of FIG. 9.
Figure 9:
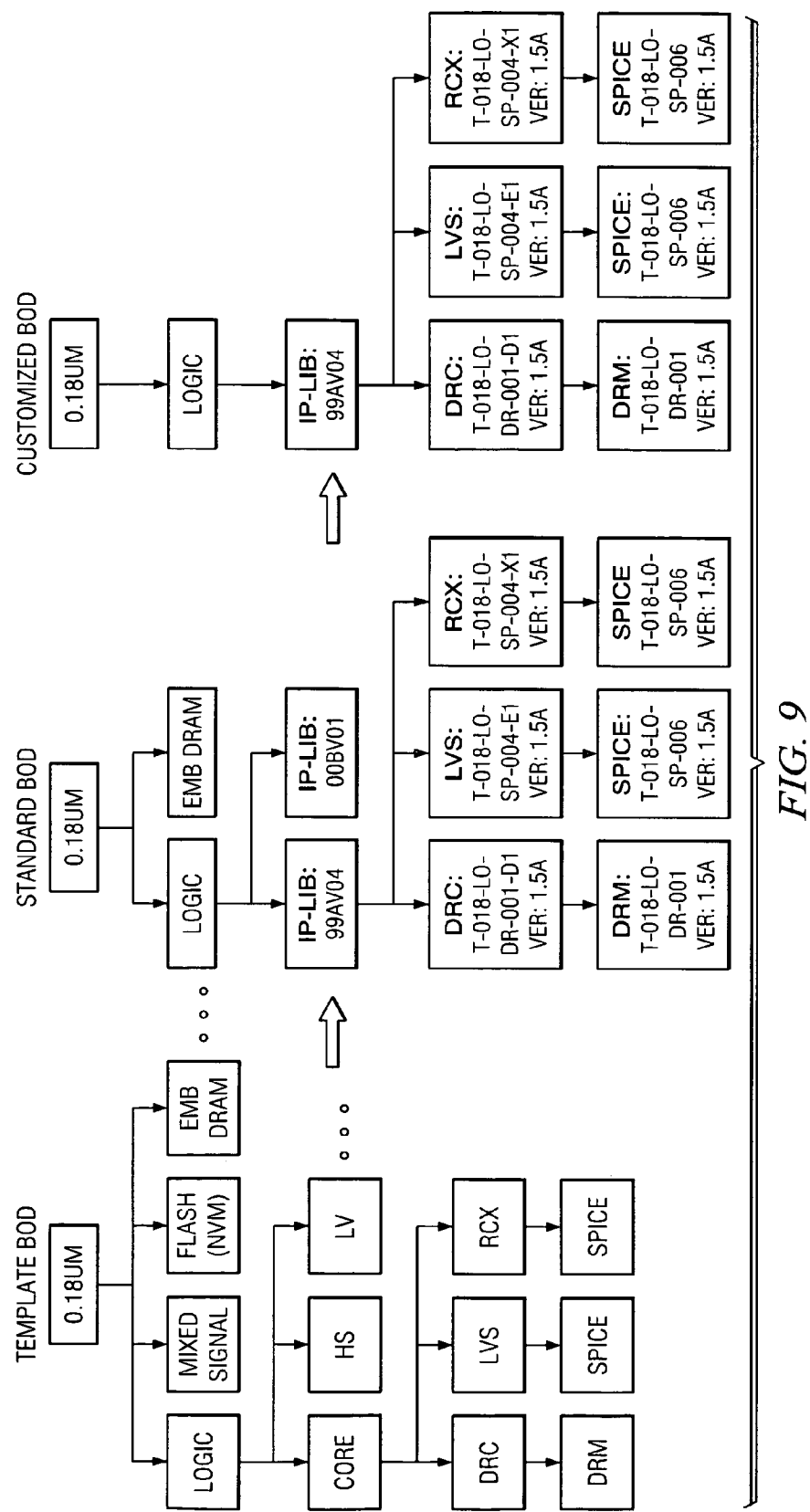
FIG. 9 illustrates a schematic of the development of a customized document portfolio in accordance with a preferred embodiment of the present invention.

FIG. 9 is a schematic illustrating the development stages leading up to a customized portfolio/BOD for a preferred embodiment. Three types of BOD are shown in FIG. 9: Template BOD, Standard BOD, and Customized BOD. The template BOD may be used by the foundry during the developmental stages for preparing a standard BOD. A template BOD defines document relationships at a document type level. Different template BODs may be developed for different technologies. FIG. 10 shows the template BOD from FIG. 9.

Referring to FIG. 10, a template BOD preferably has three types of relationships possible between each document. An example of each relationship type is illustrated in the template BOD of FIG. 10. A mixable relationship 1010 is a relationship where at least one of the components may be selected. Although in some cases, some of the components may not be co-existing in a BOD due to market offering or some other reason. A mutually exclusive relationship 1020 is a relationship where only one of the components may be selected for a given parent component once the parent component is selected. A hard link relationship 1030 is a relationship where once the parent component is selected, all components hard linked to that component are selected automatically as well.

After a template BOD is established, a standard BOD may be built up on the template BOD (e.g., via customer document privilege checked). A standard BOD will often be based on customer inputs and needs (e.g., technology requirements) to provide the maximum size and verified document list for the customer to select from at the level of document number, title, and version. The more customer input received during evaluation of the customer's needs, the more precise the document list will likely be with respect to the documents gathered and the customer's needs.

FIG. 11A shows the standard BOD from FIG. 9, which was derived from the template BOD of FIG. 10 (see e.g., FIG. 9). Note that for the standard BOD of FIG. 11A, only two of the components (Logic and Emb DRAM) were used from the four components (Logic, Mixed Signal, Flash, and Emb DRAM) from the second tier of the template BOD (see e.g., FIG. 9). In the third tier of the standard BOD in FIG. 11A, two IP libraries (intellectual property libraries) are shown: 99AV04 and 00BV01. FIG. 11B illustrates the hierarchy of the standard BOD of FIG. 11A in the form of an outline with check boxes. Referring to FIGS. 11A and 11B, three technology documents are shown linked to (i.e., related to) IP-Lib:

99AV04: DRC, LVS, and RCX. This relationship is also shown in the outline list of FIG. 11B. In a fifth tier of the standard BOD, three technology documents are shown linked to (i.e., related to) each of the three technology documents of the fourth tier, respectively: DRM, SPICE, and SPICE. Note that the same document, SPICE, is related to both the LVS and RCX documents in this example.

Summarizing the relationships in the standard BOD example of FIG. 11A, the Logic and Emb DRAM components each have a mixable relationship in the 0.18 μm technology category. The IP library documents, IP-Lib: 99AV04 and IP-Lib: 00BV01, each has a mutually exclusive relationship to the Logic component. The fourth tier technology documents (DRC, LVS, and RCX) are each related to IP-Lib: 99AV04 (in this case they are mixably related, but in other cases they may be mixably or mutually exclusively). The fifth tier technology documents (DRM and SPICE) have hard link relationships to their respective fourth tier technology documents (DRC, LVS, and RCX). In other words, DRC is a parent document related to DRM such that if DRC is selected, then DRM is automatically selected as well due to their relationship. Hence, in this example, DRM is a child document of its parent document DRC. In some cases the parent child relationship may be reversed between tiers because the hard link may go either direction (as needed for the appropriate relationships). The example standard BOD shown in FIGS. 11A and 11B is just one simplified example. The types and placements among tiers of relationships (mixable, mutually exclusive, hard linked), the number of components and documents, and the number of tiers may vary for other embodiments.

If a user were to view the standard BOD of FIG. 11A (preferably on a friendly user interface on a web site, as described above) and choose the components and documents needed while building a particular customized BOD, it may look like that of FIGS. 12A and 12B. FIG. 12A shows the customized BOD of FIG. 9. In the customized BOD of FIG. 12A, the user has chosen certain documents, as illustrated by "X" marks in the check boxes of FIG. 12B, to represent the actions of the user in selecting the documents on a user interface. Thus, based on the standard BOD of FIG. 11A, the user has created the customized BOD of FIG. 12A to suit the user's project needs.

When a customer is seeking to build a customized BOD on the foundry's website (where the standard BODs are made available to users), the customer can search the sets of related documents according to the customer's application and geometry (e.g., 0.13 μm Logic). After the customer generates its list of documents selected from a standard BOD, the customer may then save it. After saving the customized BOD, the customer can later access and/or modify the documents in that BOD.

Figure 13:
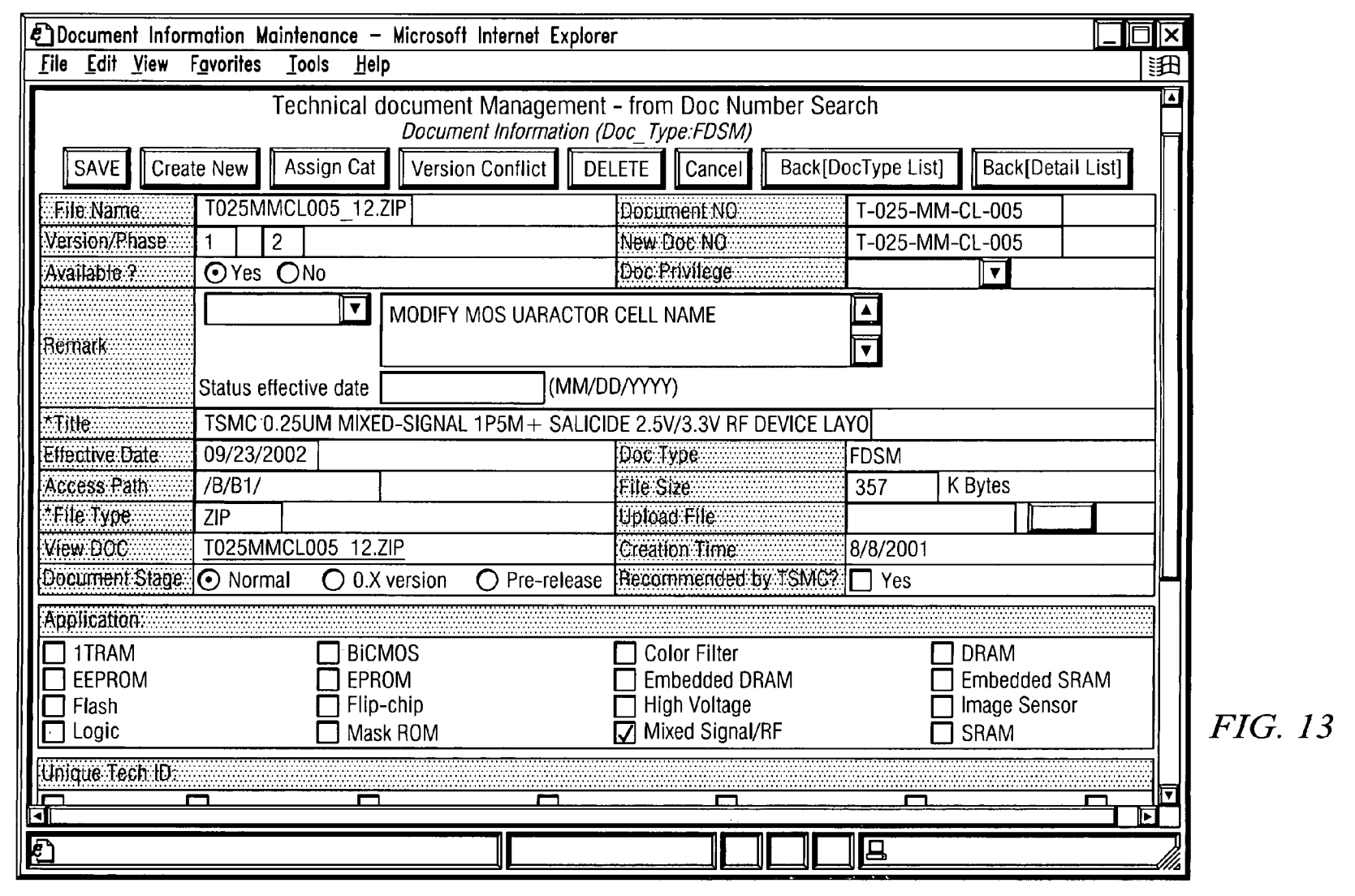

FIG. 13 shows a user interface that may be used by a system administrator of a foundry (i.e., probably never seen by a customer/user) to build and/or modify a standard BOD, or to add documents to the database. In FIG. 13, an existing document (Document No. T-025-MM-CL-005) is being modified. If desired or needed, the administrator may save it with a new document number (i.e., save as) to generate a new document based on an existing document. Also, if desired or needed, the administrator may add remarks to summarize changes made. At the document stage selectors (see FIG. 13), the administrator may designate the document as normal, a new version (0.X version), or pre-release, for example. It is at this website in FIG. 13 where an administrator may select and designate what other documents are related and what applications are relevant. As shown in FIG. 13, numerous application are listed.

Also note in FIG. 13 at the bottom of the web page, numerous "Unique Tech ID" designations are listed. In a preferred embodiment, these "Unique Tech ID" (tech-Ids hereinafter) are used to establish relationships among documents. If two documents share a same tech-ID, then they are related. Preferably, the customers/users never see the tech-IDs, as they are simply used by the system 100 and by administrators at a foundry to organize, create, and manage BODs and documents.

The letters and numbers in each tech-ID preferably have meanings associated with them. For example, consider a tech-ID of "CL013HP-1.2/3.3-ACU" for illustration. In this example, column 1 (or first character) has "C" therein, which stands for CMOS/BiCMOS(C-CMOS) applications. Column 2 is for technology type and has "L" therein, which stands for Logic. Columns 3-5 are for geometry and has "013" therein, which stands for 0.13 μm. Columns 6-7 are for application and has "HP" therein, which stands for high speed applications. Column 8 is for core voltage (in volts)/I/O voltage (in volts) and has "1.2/3.3" therein. The "-" is simply a divider to make the tech-ID easier to read. And columns 9-11 are for Beol Metal and has "ACU" therein, which stands for all copper. This is just one example of a tech-ID. As shown in FIG. 13, for example, there can be many others. A code listing may be provided for translating the meaning of any given tech-ID. Hence, each document may have any number of tech-IDs associated with it, and any given tech-ID may occur within any number of documents. By having the tech-IDs, the system 100 may quickly and automatically gather related documents using the tech-IDs.

Figure 14A:
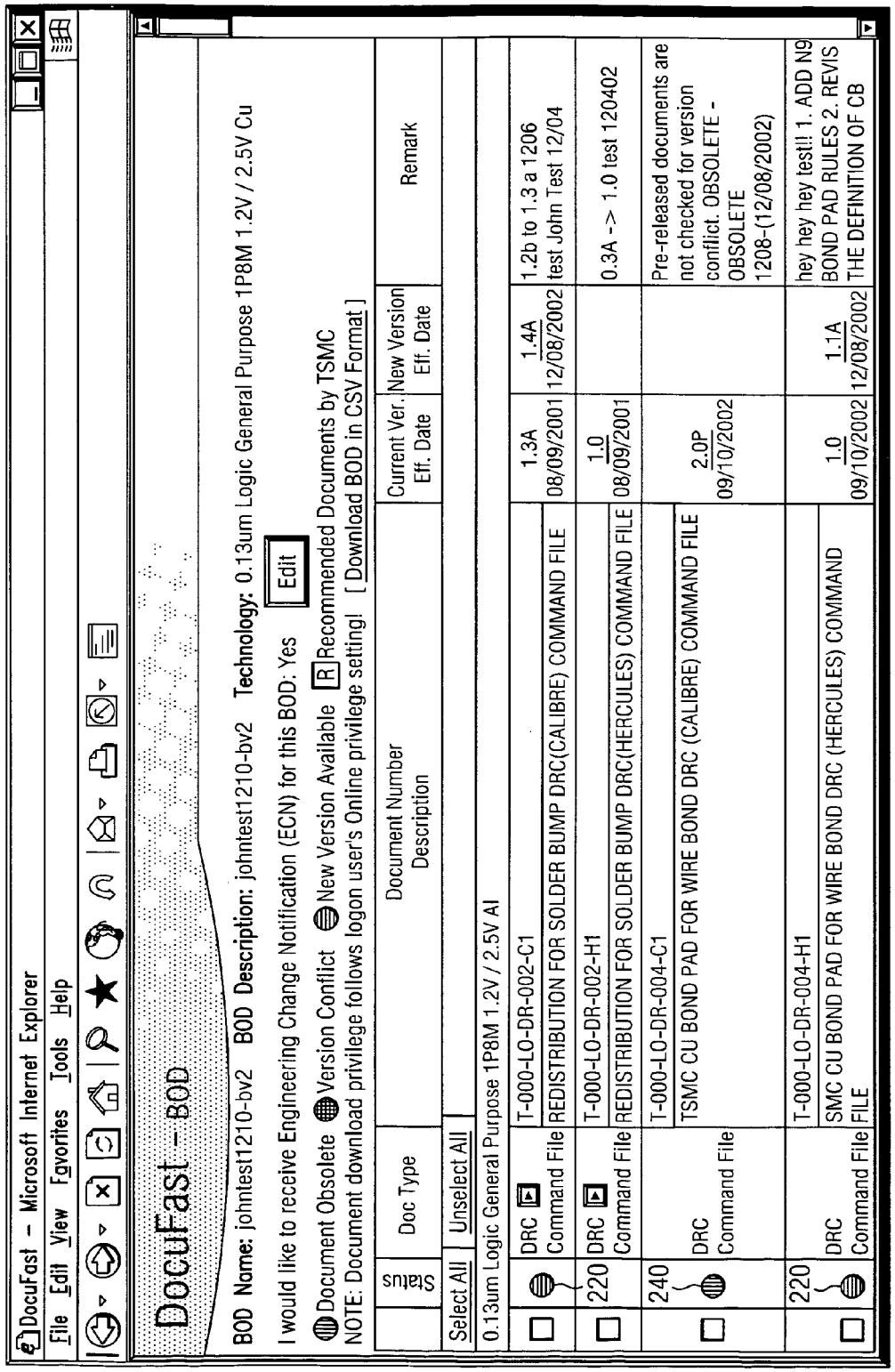

FIGS. 14A and 14B illustrate a typical user interface that may be provided for a customer while viewing the listing of documents of a BOD. The list of documents begins in FIG. 14A and continues in FIG. 14B. In this example shown in FIGS. 14A and 14B, each of the red, blue, and yellow indicators (as described above) is being used to provide notification to the user. Notice in FIG. 14A that when a new version is available, a link to that new version is preferably provide on the user interface so that the user does not have hunt for it and the user can download it immediately to update the BOD. Also note in FIG. 14B, that when a version conflict notification is provided, a link to the document needed to resolve the version conflict is preferably provided (again saving the user much time and effort). Thus, using an embodiment of the present invention should save a user or a design team much time and effort in building and maintaining portfolios of documents provided by a foundry. Also, the occurrences of misused documents (i.e., using obsolete documents or using two versions of related documents, version conflicts) should be dramatically reduced or eliminated with the use of a preferred embodiment of the present invention. This may prevent a lot of confusion and human errors, as well as a lot of money, for both customers and foundries using the present invention.

Although the present invention and its advantages have been described with respect to details of preferred embodiments and examples, it should be understood that various changes, substitutions, and alterations may be made for other embodiments without departing from the spirit and scope of the invention as defined by the appended claims. Moreover, the scope of the present application is not intended to be limited to the particular embodiments of the system, processes, steps, and user interfaces described and shown in the specification. As one of ordinary skill in the art will readily appreciate from the disclosure of the present invention, systems, processes, steps, and user interfaces presently existing or later to be developed, that perform substantially the same function or achieve substantially the same result as the corresponding embodiments described herein may be utilized according to the present invention. Accordingly, the appended claims are intended to include within their scope such systems, processes, steps, and user interfaces.

What is claimed is:

1. A customized portfolio management system, comprising:
   a document metadata database storing a plurality of pre-classified documents of an administrator and meta information thereof, one or more of the pre-classified documents having a plurality of versions;
   a web server providing an interactive website displaying the pre-classified documents and receiving one or more selections of the pre-classified documents from a user other than the administrator to create a customized portfolio; and
   a management server having a rule engine that authenticates user identification, a search engine that searches the document metadata database according to at least one selection on the website for use in creating the customized portfolio, a rule engine that identifies document status in the document metadata database, and a notification engine that monitors the status of the customized portfolio and provides notification when the status changes.

2. The system of claim 1, wherein the documents are technology documents provided by a foundry regarding integrated circuit design.

3. The system of claim 2, wherein the technology documents are pre-classified based on at least one of: fabrication geometry and electrical characteristics.

4. The system of claim 1, wherein the management server allows a user to add documents to the portfolio and delete documents from the portfolio.

5. The system of claim 1, wherein the management server further provides a sharing engine that allows a user to share access to the customized portfolio with other users.

6. The system of claim 5, wherein the notification engine provides notification to the shared users when a status of portfolio documents changes.

7. The system of claim 1, wherein the notification engine provides indicators on the website showing a status change in portfolio documents.

8. The system of claim 7, wherein the indicators signify at least one status selected from a group consisting of new document version available as an update, document version conflict, document obsolete, and recommended document.

9. The system of claim 8, wherein the indicators include color-coded symbols displayed on the website.

10. The system of claim 8, wherein the management server further allows a user to replace an existing document in the portfolio with a new version of the existing document.

11. The system of claim 8, wherein the management server further allows a user to delete obsolete documents from the portfolio.

12. A method for managing a customized document portfolio, comprising:
   providing a website that includes a browsable catalog of documents of an administrator and allows a user to select a category, at least one of the documents having multiple versions;
   displaying a list of documents on the website regarding a selected catalog;
   allowing the user to select documents from the list to create the customized document portfolio;
   monitoring document status in the customized document portfolio;
   providing a notification when a status of a document in the portfolio is changed; and
   updating the customized document portfolio based at least in part on the document status.

13. The method of claim 12, wherein the documents are technology documents regarding integrated circuit design provided by a foundry.

14. The method of claim 13, wherein the browsable catalog of documents is classified according to at least one of fabrication geometry and electrical characteristics, and wherein relationships among the technology documents are provided and stored as meta information.

15. The method of claim 14, wherein the meta information includes a unique tech ID.

16. The method of claim 12, further comprising:
   providing indicators on the website indicating status changes in portfolio documents.

17. The method of claim 12, further comprising:
   designating a group of users having shared access rights to the customized document portfolio; and
   allowing any of the designated users to access and use the customized document portfolio.

18. A user interface for document portfolio management, comprising:
   a column listing at least one portfolio containing a plurality of documents from an administrator, one or more of the documents having a plurality of versions;
   a notification column corresponding to each portfolio;
   an on-screen selection button for selecting a listed portfolio corresponding to the selection button;
   an on-screen button for invoking a displaying of a selected portfolio;
   wherein an indicator appears in the notification column when a status of a document in the portfolio has changed; and
   wherein the user interface is stored on and provided by a server.

19. A user interface for document portfolio management, comprising:
   a column listing at least one document of an administrator of a portfolio, one or more of the documents having a plurality of versions;
   a notification column corresponding to each listed document;
   an on-screen selection button for selecting a listed document corresponding to the selection button;
   an on-screen button for invoking an action for a selected document;
   wherein an indicator appears in the notification column when a status of a document in the portfolio has changed; and
   wherein the user interface is maintained on a first machine.

20. A method of providing a group of related documents, comprising:
   providing a group of technical identification codes, wherein each technical identification code is unique and represents a certain combination of technical parameters;

assigning at least one of the technical identification codes to each of a plurality of documents of an administrator in a database, one or more of the documents having a plurality of versions;

selecting a certain technical identification code from the group of codes, the certain technical identification code having been assigned to at least one of the plurality of documents;

searching for documents within the database having the certain technical identification code assigned thereto, each document having a status;

grouping the documents found in the searching into a first group of documents, the documents of the first group of documents being related via the certain technical identification code assigned thereto;

monitoring the status of each of the first group of documents;

notifying a user if the status of a document changes; and maintaining the first group of documents based at least in part by the status of each of the first group of documents.

21. The method of claim 20, further comprising:

providing a listing of the first group of documents to a user on a first user interface.

22. The method of claim 21, wherein the first user interface is provided on a website via the Internet.

23. The method of claim 21, further comprising:

allowing the user to select documents from the first group of documents to create a customized group of documents via the first user interface; and allowing the user to save the customized group of documents on via the first user interface.

24. The method of claim 23, further comprising:

allowing the user to add documents to and delete documents from the customized group of documents as needed via the first user interface.

25. The method of claim 23, further comprising:

monitoring status of documents in the customized group of documents for status changes, the status changes being selected from a group consisting of a new document version available, a document version conflict among related documents, and an obsolete document present in the customized group of documents; and providing notification of a detected status change for one or more documents in the customized group of documents.

26. The method of claim 25, wherein the notification is provided by sending an e-mail message.

27. The method of claim 25, wherein the notification is provided by a color-coded indicator displayed on a user interface listing the documents of the customized group of documents.

28. The method of claim 25, wherein the notification is provided by a color-coded indicator displayed on a user interface listing the customized group along with one or more other customized groups of documents.

29. The method of claim 25, further comprising:

providing and displaying a link for directing a user to an appropriate document corresponding to the detected status change.

* * * * *